(12) United States Patent
Huang et al.

(10) Patent No.: US 8,393,964 B2
(45) Date of Patent: Mar. 12, 2013

(54) BASE STATION FOR POSITION LOCATION

(75) Inventors: Ennin Huang, Santa Clara, CA (US); Gary M. Zalewski, Oakland, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 612 days.

(21) Appl. No.: 12/463,359

(22) Filed: May 8, 2009

(65) Prior Publication Data

US 2010/0285879 A1    Nov. 11, 2010

(51) Int. Cl.
*A63F 9/24* (2006.01)
(52) U.S. Cl. ............................. 463/36; 463/37
(58) Field of Classification Search ............ 463/36, 463/37
See application file for complete search history.

(56) References Cited

U.S. PATENT DOCUMENTS

| | | | |
|---|---|---|---|
| 3,943,277 A | 3/1976 | Everly et al. | 348/169 |
| 4,263,504 A | 4/1981 | Thomas | 235/454 |
| 4,264,072 A | 4/1981 | Chalmers | 273/85 G |
| 4,313,227 A | 1/1982 | Eder | 398/106 |
| 4,558,864 A | 12/1985 | Medwedeff | 273/148 B |
| 4,565,999 A | 1/1986 | King et al. | 345/158 |
| 4,802,227 A | 1/1989 | Elko et al. | 381/92 |
| 4,823,001 A | 4/1989 | Kobayashi et al. | 356/616 |
| 4,843,568 A | 6/1989 | Krueger et al. | 382/100 |
| 5,034,986 A | 7/1991 | Karmann et al. | 382/103 |
| 5,055,840 A | 10/1991 | Bartlett | 341/31 |
| 5,111,401 A | 5/1992 | Everett et al. | 701/24 |
| 5,144,594 A | 9/1992 | Gilchrist | 367/129 |
| 5,260,556 A | 11/1993 | Lake et al. | 235/494 |
| 5,297,061 A | 3/1994 | Dementhon et al. | 345/180 |
| 5,335,011 A | 8/1994 | Addeo et al. | 348/15 |

(Continued)

FOREIGN PATENT DOCUMENTS

| | | |
|---|---|---|
| EP | 0353200 | 1/1990 |
| EP | 0652686 | 5/1995 |

(Continued)

OTHER PUBLICATIONS

Lee, J., Hudson, S., Summet, J. and Dietz, P., "*Moveable Interactive Projected Displays Using Projector Based Tracking*", Proc. of 18th Annual ACM Symp. On User Interface Software and Technology, Oct. 23, 2005, pp. 63-72, XP002601782, ISBN: 1-59593-271-2.

(Continued)

*Primary Examiner* — Matthew W Such
*Assistant Examiner* — Robert Carpenter
(74) *Attorney, Agent, or Firm* — Martine Penilla Group, LLP

(57) ABSTRACT

In one embodiment, a system to interface with a game console to control a video game is disclosed. The system includes a game console and a base station that is interfaced with the game console. The base station has processing circuitry that is configured to send and receive data between the base station and the game console. The base station is also configured to process position data. The system also includes a controller that is interfaced with the base station. The controller has hardware to process movement data of the controller and communicate the movement data to the base station. The base station processes the position data of the controller, and relays the position data from the base station to the game console to determine a relative position of the controller to the base station. Wherein changes in the relative position of the controller facilitate interactive control with the video game.

15 Claims, 17 Drawing Sheets

U.S. PATENT DOCUMENTS

| | | | |
|---|---|---|---|
| 5,394,168 A | 2/1995 | Smith, III et al. | 345/156 |
| 5,426,450 A | 6/1995 | Drumm | 345/168 |
| 5,455,685 A | 10/1995 | Mori | 348/363 |
| 5,473,701 A | 12/1995 | Cezanne et al. | 381/92 |
| 5,485,273 A | 1/1996 | Mark et al. | 356/350 |
| 5,534,917 A | 7/1996 | MacDougall | 348/169 |
| 5,543,818 A | 8/1996 | Scott | 345/168 |
| 5,557,684 A | 9/1996 | Wang et al. | 382/107 |
| 5,563,988 A | 10/1996 | Maes et al. | 345/421 |
| 5,568,928 A | 10/1996 | Munson et al. | 463/37 |
| 5,581,276 A | 12/1996 | Cipolla et al. | 345/156 |
| 5,583,478 A | 12/1996 | Renzi | 340/407.1 |
| 5,586,231 A | 12/1996 | Florent et al. | 345/472 |
| 5,611,731 A | 3/1997 | Bouton et al. | 463/37 |
| 5,616,078 A | 4/1997 | Oh | 463/8 |
| 5,638,228 A | 6/1997 | Thomas, III | 360/60 |
| 5,649,021 A | 7/1997 | Matey et al. | 382/128 |
| 5,675,825 A | 10/1997 | Dreyer et al. | 395/800 |
| 5,675,828 A | 10/1997 | Stoel et al. | 395/825 |
| 5,677,710 A | 10/1997 | Thompson-Rohrlich | 345/173 |
| 5,706,364 A | 1/1998 | Kopec et al. | 382/159 |
| 5,768,415 A | 6/1998 | Jagadish et al. | 382/154 |
| 5,796,354 A | 8/1998 | Cartabiano et al. | 341/22 |
| 5,818,424 A | 10/1998 | Korth | 345/158 |
| 5,846,086 A | 12/1998 | Bizzi et al. | 463/247 |
| 5,850,222 A | 12/1998 | Cone | 345/418 |
| 5,850,473 A | 12/1998 | Andersson | 382/165 |
| 5,861,910 A | 1/1999 | McGarry et al. | 348/87 |
| 5,870,100 A | 2/1999 | DeFreitas | 345/441 |
| 5,883,616 A | 3/1999 | Koizumi et al. | 345/156 |
| 5,889,672 A | 3/1999 | Schuler et al. | 700/83 |
| 5,900,863 A | 5/1999 | Numazaki | 345/158 |
| 5,913,727 A | 6/1999 | Ahdoot | 463/39 |
| 5,914,723 A | 6/1999 | Gajewska | 345/597 |
| 5,917,493 A | 6/1999 | Tan et al. | 715/835 |
| 5,923,306 A | 7/1999 | Smith et al. | 345/2 |
| 5,923,318 A | 7/1999 | Zhai et al. | 345/157 |
| 5,929,444 A | 7/1999 | Leichner | 250/341.7 |
| 5,930,383 A | 7/1999 | Netaer | 382/154 |
| 5,930,741 A | 7/1999 | Kramer | 702/153 |
| 5,937,081 A | 8/1999 | O'Brill et al. | 382/111 |
| 5,959,596 A | 9/1999 | McCarten et al. | 345/2 |
| 5,963,250 A | 10/1999 | Parker et al. | 348/211.6 |
| 5,993,314 A | 11/1999 | Dannenberg et al. | 461/1 |
| 6,009,210 A | 12/1999 | Kang | 382/276 |
| 6,021,219 A | 2/2000 | Andersson et al. | 382/190 |
| 6,031,545 A | 2/2000 | Ellenby et al. | 345/435 |
| 6,031,934 A | 2/2000 | Ahmad et al. | 382/154 |
| 6,037,942 A | 3/2000 | Millington | 715/835 |
| 6,044,181 A | 3/2000 | Szeliski et al. | 382/284 |
| 6,049,619 A | 4/2000 | Anandan et al. | 382/107 |
| 6,056,640 A | 5/2000 | Schaaij | 463/4 |
| 6,057,909 A | 5/2000 | Yahav et al. | 356/5.04 |
| 6,061,055 A | 5/2000 | Marks | 382/154 |
| 6,075,895 A | 6/2000 | Qiao et al. | 382/218 |
| 6,078,789 A | 6/2000 | Bodenmann et al. | 455/66 |
| 6,091,905 A | 7/2000 | Yahav et al. | 396/106 |
| 6,094,625 A | 7/2000 | Ralston | 702/150 |
| 6,097,369 A | 8/2000 | Wambach | 345/158 |
| 6,100,517 A | 8/2000 | Yahav et al. | 250/208.1 |
| 6,100,895 A | 8/2000 | Miura et al. | 345/426 |
| 6,101,289 A | 8/2000 | Kellner | 382/276 |
| 6,115,052 A | 9/2000 | Freeman et al. | 345/473 |
| 6,134,346 A | 10/2000 | Berman et al. | 382/163 |
| 6,144,367 A | 11/2000 | Berstis | 345/158 |
| 6,151,009 A | 11/2000 | Kanade et al. | 345/641 |
| 6,160,540 A | 12/2000 | Fishkin et al. | 345/184 |
| 6,166,744 A | 12/2000 | Jaszlics et al. | 345/435 |
| 6,173,059 B1 | 1/2001 | Huang et al. | 381/92 |
| 6,175,343 B1 | 1/2001 | Mitchell et al. | 345/8 |
| 6,184,863 B1 | 2/2001 | Sibert et al. | 345/156 |
| 6,191,773 B1 | 2/2001 | Maruno et al. | 345/158 |
| 6,195,104 B1 | 2/2001 | Lyons | 345/473 |
| 6,215,898 B1 | 4/2001 | Woodfill et al. | 382/154 |
| 6,243,491 B1 | 6/2001 | Andersson | 382/165 |
| 6,275,213 B1 | 8/2001 | Tremblay et al. | 345/156 |
| 6,281,930 B1 | 8/2001 | Parker et al. | 348/211.9 |
| 6,282,362 B1 | 8/2001 | Murphy et al. | 386/46 |
| 6,295,064 B1 | 9/2001 | Yamaguchi | 345/419 |
| 6,297,838 B1 | 10/2001 | Chang et al. | 715/863 |
| 6,304,267 B1 | 10/2001 | Sata | 345/427 |
| 6,307,549 B1 | 10/2001 | King et al. | 715/810 |
| 6,307,568 B1 | 10/2001 | Rom | 345/629 |
| 6,323,839 B1 | 11/2001 | Fukuda et al. | 345/157 |
| 6,323,942 B1 | 11/2001 | Bamji | 356/5.01 |
| 6,326,901 B1 | 12/2001 | Gonzales | 340/7.2 |
| 6,327,073 B1 | 12/2001 | Yahav et al. | 359/321 |
| 6,331,911 B1 | 12/2001 | Manassen et al. | 359/260 |
| 6,346,929 B1 | 2/2002 | Fukushima et al. | 354/8 |
| 6,351,661 B1 | 2/2002 | Cosman | 600/426 |
| 6,371,849 B1 | 4/2002 | Togami | 463/4 |
| 6,392,644 B1 | 5/2002 | Miyata et al. | 345/419 |
| 6,394,897 B1 | 5/2002 | Togami | 463/4 |
| 6,400,374 B2 | 6/2002 | Lanier | 345/630 |
| 6,409,602 B1 | 6/2002 | Wiltshire et al. | 463/42 |
| 6,411,392 B1 | 6/2002 | Bender et al. | 358/1.14 |
| 6,411,744 B1 | 6/2002 | Edwards | 382/294 |
| 6,417,836 B1 | 7/2002 | Kumar et al. | 345/156 |
| 6,441,825 B1 | 8/2002 | Peters | 345/473 |
| 6,473,516 B1 | 10/2002 | Kawaguchi et al. | 382/100 |
| 6,498,860 B1 | 12/2002 | Sasaki et al. | 382/103 |
| 6,504,535 B1 | 1/2003 | Edmark | 345/419 |
| 6,516,466 B1 | 2/2003 | Jackson | 725/62 |
| 6,533,420 B1 | 3/2003 | Eichenlaub | 353/7 |
| 6,542,927 B2 | 4/2003 | Rhoads | 709/217 |
| 6,545,706 B1 | 4/2003 | Edwards et al. | 348/169 |
| 6,546,153 B1 | 4/2003 | Hoydal | 382/285 |
| 6,556,704 B1 | 4/2003 | Chen | 382/154 |
| 6,577,748 B2 | 6/2003 | Chang | 382/100 |
| 6,580,414 B1 | 6/2003 | Wergen et al. | 345/156 |
| 6,580,415 B1 | 6/2003 | Kato et al. | 345/156 |
| 6,587,573 B1 | 7/2003 | Stam et al. | 382/104 |
| 6,593,956 B1 | 7/2003 | Potts et al. | 348/14.09 |
| 6,621,938 B1 | 9/2003 | Tanaka et al. | 382/276 |
| 6,628,265 B2 | 9/2003 | Hwang | 345/156 |
| 6,661,914 B2 | 12/2003 | Dufour | 382/154 |
| 6,674,415 B2 | 1/2004 | Nakamura et al. | 345/32 |
| 6,676,522 B2 | 1/2004 | Rowe et al. | 463/42 |
| 6,677,967 B2 | 1/2004 | Sawano et al. | 715/839 |
| 6,677,987 B1 | 1/2004 | Girod | 348/171 |
| 6,709,108 B2 | 3/2004 | Levine et al. | 351/211 |
| 6,720,949 B1 | 4/2004 | Pryor et al. | 345/158 |
| 6,727,988 B2 | 4/2004 | Kim et al. | 356/319 |
| 6,741,741 B2 | 5/2004 | Farrell | 382/199 |
| 6,746,124 B2 | 6/2004 | Fischer et al. | 353/43 |
| 6,751,338 B1 | 6/2004 | Wallack | 382/106 |
| 6,753,849 B1 | 6/2004 | Curran et al. | 345/158 |
| 6,767,282 B2 | 7/2004 | Matsuyama et al. | 463/3 |
| 6,769,769 B2 | 8/2004 | Podlleanu et al. | 351/221 |
| 6,772,057 B2 | 8/2004 | Breed et al. | 701/45 |
| 6,774,939 B1 | 8/2004 | Peng | 348/231.4 |
| 6,785,329 B1 | 8/2004 | Pan et al. | 375/240.08 |
| 6,789,967 B1 | 9/2004 | Forester | 400/489 |
| 6,791,531 B1 | 9/2004 | Johnston et al. | 345/157 |
| 6,795,068 B1 | 9/2004 | Marks | 345/419 |
| 6,809,776 B1 | 10/2004 | Simpson et al. | 348/565 |
| 6,819,318 B1 | 11/2004 | Geng | 345/420 |
| 6,847,311 B2 | 1/2005 | Li | 341/28 |
| 6,863,609 B2 | 3/2005 | Okuda et al. | 463/36 |
| 6,881,147 B2 | 4/2005 | Naghi et al. | 463/35 |
| 6,884,171 B2 | 4/2005 | Eck et al. | 463/42 |
| 6,890,262 B2 | 5/2005 | Oishi et al. | 463/31 |
| 6,917,688 B2 | 7/2005 | Yu et al. | 381/94.7 |
| 6,919,824 B2 | 7/2005 | Lee | 341/20 |
| 6,924,787 B2 | 8/2005 | Kramer et al. | 345/156 |
| 6,928,180 B2 | 8/2005 | Stam et al. | 382/104 |
| 6,930,725 B1 | 8/2005 | Hayashi | 348/373 |
| 6,931,596 B2 | 8/2005 | Gutta et al. | 715/728 |
| 6,943,776 B2 | 9/2005 | Ehrenburg | 345/168 |
| 6,945,653 B2 | 9/2005 | Kobori et al. | 353/30 |
| 6,951,515 B2 | 10/2005 | Ohshima et al. | 463/31 |
| 6,952,198 B2 | 10/2005 | Hansen | 345/158 |
| 6,965,362 B1 | 11/2005 | Ishizuka | 345/82 |
| 6,970,183 B1 | 11/2005 | Monroe | 348/143 |
| 6,990,639 B2 | 1/2006 | Wilson | 715/863 |
| 7,006,009 B2 | 2/2006 | Newman | 340/854.5 |
| 7,016,411 B2 | 3/2006 | Azuma et al. | 375/240.08 |

| | | | |
|---|---|---|---|
| 7,039,199 B2 | 5/2006 | Rui | 381/92 |
| 7,039,253 B2 | 5/2006 | Matsuoka et al. | 382/295 |
| 7,042,440 B2 | 5/2006 | Pryor et al. | 345/158 |
| 7,043,056 B2 | 5/2006 | Edwards et al. | 382/103 |
| 7,054,452 B2 | 5/2006 | Ukita | 381/92 |
| 7,059,962 B2 | 6/2006 | Watashiba | 463/2 |
| 7,061,507 B1 | 6/2006 | Tuomi et al. | 345/611 |
| 7,071,914 B1 | 7/2006 | Marks | 345/156 |
| 7,090,352 B2 | 8/2006 | Kobori et al. | 353/30 |
| 7,098,891 B1 | 8/2006 | Pryor | 345/158 |
| 7,102,615 B2 | 9/2006 | Marks | 345/156 |
| 7,106,366 B2 | 9/2006 | Parker et al. | 348/222.1 |
| 7,116,330 B2 | 10/2006 | Marshall et al. | 345/474 |
| 7,116,342 B2 | 10/2006 | Dengler et al. | 345/630 |
| 7,121,946 B2 | 10/2006 | Paul et al. | 463/36 |
| 7,139,767 B1 | 11/2006 | Taylor et al. | 707/102 |
| 7,148,922 B2 | 12/2006 | Shimada | 348/370 |
| 7,164,413 B2 | 1/2007 | Davis et al. | 345/163 |
| 7,183,929 B1 | 2/2007 | Antebi et al. | 340/573.1 |
| 7,212,308 B2 | 5/2007 | Morgan | 358/1.18 |
| 7,223,173 B2 | 5/2007 | Masuyama et al. | 463/36 |
| 7,224,384 B1 | 5/2007 | Iddan et al. | 348/207.99 |
| 7,227,526 B2 | 6/2007 | Hildreth et al. | 345/156 |
| 7,227,976 B1 | 6/2007 | Jung et al. | 382/103 |
| 7,245,273 B2 | 7/2007 | Eberl et al. | 351/211 |
| 7,259,375 B2 | 8/2007 | Tichit et al. | 250/341.8 |
| 7,263,462 B2 | 8/2007 | Funge et al. | 702/179 |
| 7,274,305 B1 | 9/2007 | Lutrell | 340/870.02 |
| 7,283,679 B2 | 10/2007 | Okada et al. | 382/260 |
| 7,296,007 B1 | 11/2007 | Funge et al. | 706/47 |
| 7,301,530 B2 | 11/2007 | Lee et al. | 345/158 |
| 7,305,114 B2 | 12/2007 | Wolff et al. | 709/200 |
| 7,346,387 B1 | 3/2008 | Wachter et al. | 600/476 |
| 7,352,359 B2 | 4/2008 | Zalewski et al. | 345/156 |
| 7,364,297 B2 | 4/2008 | Goldfain et al. | 351/206 |
| 7,379,559 B2 | 5/2008 | Wallace et al. | 382/100 |
| 7,391,409 B2 | 6/2008 | Zalewski et al. | 345/156 |
| 7,436,887 B2 | 10/2008 | Yeredor et al. | 375/240 |
| 7,446,650 B2 | 11/2008 | Schofield et al. | 340/425.5 |
| 7,545,926 B2 | 6/2009 | Mao | 379/406.08 |
| 7,558,698 B2 | 7/2009 | Funge et al. | 702/179 |
| 7,613,610 B1 | 11/2009 | Zimmerman et al. | 704/235 |
| 7,623,115 B2 | 11/2009 | Marks | 345/156 |
| 7,627,139 B2 | 12/2009 | Marks et al. | 382/103 |
| 7,636,645 B1 | 12/2009 | Yen et al. | 702/152 |
| 7,697,700 B2 | 4/2010 | Mao | 381/94.3 |
| 7,721,231 B2 | 5/2010 | Wilson | 715/863 |
| 2001/0056477 A1 | 12/2001 | McTernan et al. | 709/219 |
| 2002/0010655 A1 | 1/2002 | Kjallstrom | 705/27 |
| 2002/0056114 A1 | 5/2002 | Fillebrown et al. | 725/78 |
| 2002/0072414 A1 | 6/2002 | Stylinski et al. | 463/42 |
| 2002/0075286 A1 | 6/2002 | Yonezawa et al. | 345/679 |
| 2002/0083461 A1 | 6/2002 | Hutcheson et al. | 725/62 |
| 2002/0085097 A1 | 7/2002 | Colmenarez et al. | 348/211 |
| 2002/0094189 A1 | 7/2002 | Navab et al. | 386/4 |
| 2002/0107069 A1 | 8/2002 | Ishino | 463/30 |
| 2002/0126899 A1 | 9/2002 | Farrell | 382/209 |
| 2002/0134151 A1 | 9/2002 | Naruoka et al. | 73/291 |
| 2002/0158873 A1 | 10/2002 | Williamson | 345/427 |
| 2003/0014212 A1 | 1/2003 | Ralston et al. | 702/150 |
| 2003/0022716 A1 | 1/2003 | Park et al. | 463/36 |
| 2003/0093591 A1 | 5/2003 | Hohl | 710/22 |
| 2003/0100363 A1 | 5/2003 | Ali | 436/30 |
| 2003/0160862 A1 | 8/2003 | Charlier et al. | 348/14.08 |
| 2003/0232649 A1 | 12/2003 | Gizis et al. | 463/40 |
| 2004/0001082 A1 | 1/2004 | Said | 345/730 |
| 2004/0017355 A1 | 1/2004 | Shim | 345/157 |
| 2004/0063480 A1 | 4/2004 | Wang | 463/8 |
| 2004/0063481 A1 | 4/2004 | Wang | 463/8 |
| 2004/0070565 A1 | 4/2004 | Nayar et al. | 345/156 |
| 2004/0087366 A1 | 5/2004 | Shum et al. | 463/36 |
| 2004/0095327 A1 | 5/2004 | Lo | 345/169 |
| 2004/0140955 A1 | 7/2004 | Metz | 345/166 |
| 2004/0150728 A1 | 8/2004 | Ogino | 348/239 |
| 2004/0178576 A1 | 9/2004 | Hillis et al. | 273/148 |
| 2004/0213419 A1 | 10/2004 | Varma et al. | 381/92 |
| 2004/0227725 A1 | 11/2004 | Calarco et al. | 345/156 |
| 2004/0254017 A1 | 12/2004 | Cheng | 463/35 |
| 2005/0037844 A1 | 2/2005 | Shum et al. | 463/36 |
| 2005/0047611 A1 | 3/2005 | Mao | 381/94.7 |
| 2005/0088369 A1 | 4/2005 | Yoshioka | 345/60 |
| 2005/0102374 A1 | 5/2005 | Moragne et al. | 709/217 |
| 2005/0105777 A1 | 5/2005 | Koslowski et al. | 382/115 |
| 2005/0117045 A1 | 6/2005 | Abdellatif et al. | 384/335 |
| 2005/0150697 A1 | 7/2005 | Altman et al. | 178/19.02 |
| 2005/0198095 A1 | 9/2005 | Du et al. | 709/200 |
| 2005/0226431 A1 | 10/2005 | Mao | 381/61 |
| 2005/0239548 A1 | 10/2005 | Ueshima et al. | 463/36 |
| 2006/0033713 A1 | 2/2006 | Pryor | 345/158 |
| 2006/0035710 A1 | 2/2006 | Festejo et al. | 463/36 |
| 2006/0038819 A1 | 2/2006 | Festejo et al. | 345/530 |
| 2006/0204012 A1 | 9/2006 | Marks et al. | 381/26 |
| 2006/0233389 A1 | 10/2006 | Mao et al. | 381/92 |
| 2006/0252541 A1 | 11/2006 | Zalewski et al. | 463/156 |
| 2006/0256081 A1 | 11/2006 | Zalewski et al. | 345/156 |
| 2006/0264258 A1 | 11/2006 | Zalewski et al. | 463/36 |
| 2006/0264259 A1 | 11/2006 | Zalewski et al. | 463/36 |
| 2006/0264260 A1 | 11/2006 | Zalewski et al. | 463/36 |
| 2006/0269072 A1 | 11/2006 | Mao | 381/56 |
| 2006/0269073 A1 | 11/2006 | Mao | 381/56 |
| 2006/0274032 A1 | 12/2006 | Mao et al. | 345/156 |
| 2006/0274911 A1 | 12/2006 | Mao et al. | 381/334 |
| 2006/0280312 A1 | 12/2006 | Mao | 381/56 |
| 2006/0282873 A1 | 12/2006 | Zalewski et al. | 725/133 |
| 2006/0287084 A1 | 12/2006 | Mao et al. | 463/37 |
| 2006/0287085 A1 | 12/2006 | Mao et al. | 463/37 |
| 2006/0287086 A1 | 12/2006 | Zalewski et al. | 436/37 |
| 2006/0287087 A1 | 12/2006 | Zalewski et al. | 463/37 |
| 2007/0015559 A1 | 1/2007 | Zalewski et al. | 463/1 |
| 2007/0021208 A1 | 1/2007 | Mao et al. | 463/36 |
| 2007/0025562 A1 | 2/2007 | Zalewski et al. | 381/92 |
| 2007/0060336 A1 | 3/2007 | Marks et al. | 463/30 |
| 2007/0061413 A1 | 3/2007 | Larsen et al. | 709/217 |
| 2007/0066394 A1 | 3/2007 | Ikeda et al. | 463/37 |
| 2007/0072675 A1 | 3/2007 | Hammano et al. | 463/42 |
| 2007/0120834 A1 | 5/2007 | Boillot | 354/103 |
| 2007/0120996 A1 | 5/2007 | Boillot | 384/345 |
| 2007/0260340 A1 | 11/2007 | Mao | 700/94 |
| 2007/0260517 A1 | 11/2007 | Zalewski et al. | 705/14 |
| 2007/0261077 A1 | 11/2007 | Zalewski et al. | 725/35 |
| 2008/0056561 A1 | 3/2008 | Sawachi | 382/154 |
| 2008/0070684 A1 | 3/2008 | Haigh-Hutchinson | 463/32 |
| 2008/0091421 A1 | 4/2008 | Gustavsson | 704/233 |
| 2008/0311990 A1* | 12/2008 | Chiu et al. | 463/37 |
| 2008/0318679 A1 | 12/2008 | Tran et al. | 463/39 |
| 2009/0002316 A1 | 1/2009 | Rofougaran | 345/156 |
| 2009/0010494 A1 | 1/2009 | Bechtel et al. | 382/104 |
| 2009/0016642 A1 | 1/2009 | Hart | 382/278 |
| 2009/0221368 A1 | 9/2009 | Yen et al. | 463/32 |
| 2009/0221374 A1 | 9/2009 | Yen et al. | 463/42 |
| 2009/0288064 A1 | 11/2009 | Yen et al. | 717/106 |
| 2010/0004896 A1 | 1/2010 | Yen et al. | 702/153 |
| 2010/0137064 A1 | 6/2010 | Shum et al. | 463/36 |
| 2011/0009194 A1* | 1/2011 | Gabai et al. | 463/36 |

FOREIGN PATENT DOCUMENTS

| | | |
|---|---|---|
| EP | 0750202 | 12/1996 |
| EP | 0835676 | 4/1998 |
| EP | 1098686 | 5/2003 |
| EP | 1435258 | 7/2004 |
| EP | 1 764 140 A1 | 3/2007 |
| FR | 2814965 | 4/2002 |
| GB | 2206716 | 1/1989 |
| GB | 2206716 | 11/1989 |
| GB | 2376397 | 11/2002 |
| GB | 2388418 | 11/2003 |
| JP | 01-284897 | 11/1989 |
| JP | 06-102980 | 4/1994 |
| JP | 07-311568 | 11/1995 |
| JP | 9-128141 | 5/1997 |
| JP | 9-185456 | 7/1997 |
| JP | 11-38949 | 2/1999 |
| JP | 2000-172431 | 6/2000 |
| JP | 2000259856 | 9/2000 |
| JP | 2000350859 | 12/2000 |
| JP | 2001-166676 | 6/2001 |
| JP | 2002369969 | 12/2002 |
| JP | 2004-145448 | 5/2004 |

| | | |
|---|---|---|
| JP | 2004145448 | 5/2004 |
| JP | 2005-046422 | 2/2005 |
| WO | WO 88/05942 | 8/1988 |
| WO | WO 98/48571 | 10/1998 |
| WO | WO 99/35633 | 7/1999 |
| WO | WO 99/26198 | 10/1999 |
| WO | WO 02/27456 | 2/2002 |
| WO | WO 03/079179 | 9/2003 |
| WO | WO 2005/073838 | 8/2005 |
| WO | WO 2005107911 | 11/2005 |
| WO | WO 2007095082 | 8/2007 |
| WO | WO 2008/056180 | 5/2008 |

OTHER PUBLICATIONS

Summet, J. and Sukthankar, R., "*Tracking Locations of Moving Hand-Held Displays Using Projected Light*", Lecture Notes in Computer Science (Pervasive Computing), vol. 3468/2005, 2005, pp. 37-46, XP002601789.

Lee, J., "*Projector-Based Location Discovery and Tracking*" Carnegie Mellon University, Pittsburgh, PA; May 2008, XP002601796 URL: http://johnnylee.net/projects/thesis/thesis_document.

Ephraim et al. "Speech Enhancement Using a Minimum Mean-Square Error Log-Spectral Amplitude Estimator", 1985, IEEE.

Ephraim et al. "Speech Enhancement Using a Minimum Mean-Square Error Short-Time Spectral Amplitude Estimator", 1984, IEEE.

Richardson et al. "Virtual Network Computing", 1998, IEEE Internet Computing vol. 2.

XP-002453974, "CFS and FS95/98/2000: How to Use the Trim Controls to Keep Your Aircraft Level", Aug. 10, 2007, http://support.microsoft.com/?scid=kb%3Ben-us%3B175195&x=13&y=15.

"The Tracking Cube: A Three-Dimentional Input Device", IBM Technical Disclosure Bulletin, Aug. 1, 1989, pp. 91-95, No. 3B, IBM Corp.New York, U.S.

K. B. Shimoga, et al., "Touch and Force Reflection for Telepresence Surgery", Engineering in Medicine and Biology Opportunities of the IEEEE, Baltimore, MD, USA, Nov. 3, 1994, New York, New York, USA, pp. 1049-1050.

Iddan, et al., "3D Imaging in the Studio (and Elsewhere . . . )", Proceedings of the SPIE, SPIE, Bellingham, VA, US, vol. 4298, Jan. 24, 2001, pp. 48-55, XP008005351.

Jojic, et al., "Tracking Self-Occluding Articulated Objects in Dense Disparity Maps", Computer Vision, 1999, The Proceedings fo the Seventh IEEE International Conference on Kerkyra, Greece Sep. 20-27, 1999, Los Alamitos, CA, US, IEEE Computer Society, US, Sep. 20, 1999, pp. 123-130.

Klinker, et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.

Nakagawa, et al., "A Collision Detection and Motion Image Synthesis Between a Background Image and a Foreground 3-Dimensional Object", TVRSJ Bol. 4, No. 2, pp. 425-430, 1999, Japan.

Mihara, et al., "A Realtime Vision-Based Interface Using Motion Processor and Applications to Robotics", vol. J84-D-11, No. 9, pp. 2070-2078, Sep. 2001, Japan.

Nakamura, et al., "A Consideration on Reconstructing 3-D Model Using Object Views", 2004-01601-003, pp. 17-21, Kokkaido University, Japan, nakamura@media.eng.hokudai.ac.jp.

Nisbida, et al., "A Method of Estimating Human Shapes by Fitting the Standard Human Model to Partial Measured Data", D-II vol. J84-D-II, No. 7, pp. 1310-1318, Jul. 2001.

Wilson & Darrell, "Audio-Video Array Source Localization for Intelligent Environments", 2002 IEEE Dept. of Electrical Eng and Computer Science, MIT, Cambridge, MA 02139.

Fiala, et al., "A Panoramic Video and Acoustic Beamforming Sensor for Videoconferencing", 2004 IEEE, Computational Video Group, National Research Council, Ottawa, Canada KIA 0R6.

Hemmi, et al., "3-D Natural Interactive Interface-Using Marker Tracking from a Single View",Sep. 9, 1991, Systems and Computers in Japan.

Lanier, Jaron, "Virtually there: three-dimensional tele-immersion may eventually bring the world to your desk", Scientific American, ISSN: 0036-8733, Year: 2001.

Richardson et al., "Virtual Network Computing" IEEE Internet Computing, vol. 2,No. 1 Jan./Feb. 1998.

Fujitsu, "Internet Development of Emulators" Abstract, Mar. 1997, vol. 48, No. 2.

Kanade, et al., "A Stereo Machine for Video-rate Dense Depth Mapping and Its New Application" 1996, CVPR 96, IEEE Computer Society Conference, pp. 196-202 (022).

Gvili, et al., "Depth Keying", SPIE vol. 5006 (2003), 2003 SPIE-IS &T, pp. 564-574 (031).

\* cited by examiner

BASE STATION FOR POSITION LOCATION

CROSS REFERENCE TO RELATED APPLICATIONS

The present application is related to (1) U.S. patent application Ser. No. 12/145,455, entitled "DETERMINATION OF CONTROLLER THREE-DIMENTIONAL LOCATION USING IMAGE ANALYSIS AND ULTRASONIC COMMUNICATION", filed on Jun. 24, 2008, and (2) U.S. patent application Ser. No. 12/463,360, titled "BASE STATION MOVEMENT AND COMPENSATION", filed on the same date as the instant application, each of which is herein incorporated by reference.

BACKGROUND

Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture captured by a video camera that tracks an object.

However, placement of the video camera and other electronic devices to track user input can be difficult. With larger televisions and monitors, users are required to stand further away from the television to take in the entire picture. As consoles are generally located close to the television, this can lead to decreased sensor performance. Similarly, video cameras for tracking and depth sensing can have decreased performance as users move further from the camera.

It is within this context that embodiments of the invention arise.

SUMMARY OF THE INVENTION

Broadly speaking, the present invention provides communications and feedback to control a video game based on movement of a controller relative to a base station. The base station is configured to establish a reference plane that assists in determining relative movement of the controllers. The base station also allows visual and audible feedback to be supplied to users.

In one embodiment, a system to interface with a game console to control a video game is disclosed. The system includes a game console and a base station that is interfaced with the game console. The base station has processing circuitry that is configured to send and receive data between the base station and the game console. The base station is also configured to process position data. The system also includes a controller that is interfaced with the base station. The controller has hardware to process movement data of the controller and communicate the movement data to the base station. The base station processes the position data of the controller, and relays the position data from the base station to the game console to determine a relative position of the controller to the base station. Wherein changes in the relative position of the controller facilitate interactive control with the video game.

In another embodiment, a system to determine position of a controller relative to a base station during game play is disclosed. The system includes a game console for facilitating the game play and a controller having controller hardware. The controller hardware includes motion sensing devices and a radio to send motion data from the motion sensing devices. The system further includes a base station that is in communication with the controller and the game console. The base station has a radio to receive the motion data from the motion sensing devices, and also has circuitry to define a reference plane. The circuitry includes a light emitter that projects a reference line that visually extends from and away from the base station. The reference line is representative of the reference plane and the base station has adjustable features that allow the reference line to be approximately leveled relative to a supporting surface. Wherein, the reference plane is used to determine the position of the controller relative to the base station.

In still another embodiment, a method for interacting with a game console to control a video game is disclosed. The method includes an operation that establishes communications between the game console and a base station. In another operation the base station is calibrated to establishing a reference plane to determine a position relative to the base station. In still another operation, communication is established between a controller and the base station to transmit motion detection data from the controller to the base station. The method further includes an operation that determines a first position of the controller relative to the base station using the reference plane and a first sample of the motion detection data. In another operation a second position of the controller relative to the base station is determined using a second sample of the motion detection data. The method continues with the video game being controlled based on changes between the first position and the second position.

BRIEF DESCRIPTION OF THE DRAWINGS

The invention, together with further advantages thereof, may best be understood by reference to the following description taken in conjunction with the accompanying drawings.

DETAILED DESCRIPTION

An invention is disclosed for using a base station to establish a reference plane to assist in determining relative movement of game console controllers. Wireless game console controllers allow for user movement to be translated into game control, thereby increasing the realism of a video game. Establishing a reference plane with a mobile base station allows users to move sensors close to the controllers for more accurate and precise control. Additionally, the base station allows for improved interactivity as the base station can provide sensory feedback to users.

Figure 1A:
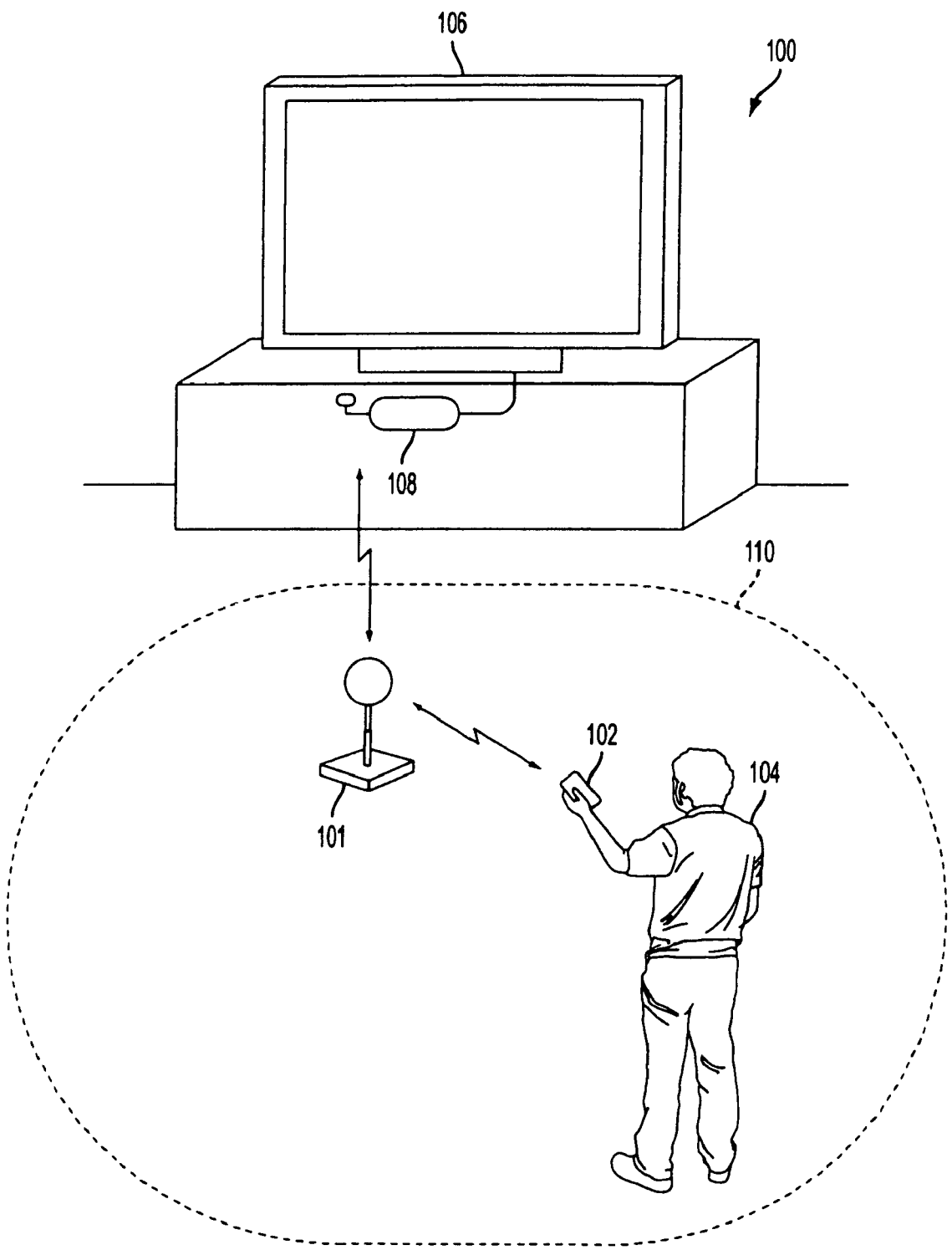
FIG. 1A is an exemplary illustration of a scene that includes a base station, a user manipulating a controller along with a game console and a monitor, in accordance with one embodiment of the present invention.

FIG. 1A is an exemplary illustration of a scene 100 that includes a base station 101, a user 104 manipulating a controller 102 along with a game console 108 and a monitor 106, in accordance with one embodiment of the present invention. The monitor 106 displays video output from the game console 108. The user 104 interacts with the game console 108 via video displayed on the monitor 106 using the controller 102 and the base station 101. In one embodiment, the monitor 106 is a television that is also capable of reproducing audio output from the game console 108. In other embodiments, audio output from the game console 108 is reproduced using multiple speakers to create an immersive multimedia experience. The base station 101 provides communication between the game console 108 and the controller 102 with a zone of play 110.

The use of the base station defines a zone of play 110 away from the console 108. Some of the advantages of establishing the zone of play 110 away from the console 108 include, but are not limited to bringing sensors within the base station 101 close to the user 104. The base station provides a mobile platform for sensors that can transmit and send data to and from the controllers that can be moved throughout the scene 100. The mobility of the base station allows sensors to be moved away from the console and closer to users and the associated controllers. The closer proximity of the base station to the controllers allows for both improved detection of controller movement and increased interactivity. In one embodiment, the base station provides visual and audible feedback to the user 104 and also is used to determine the location of the controller 102 within the scene 100.

In one embodiment, the controller 102 communicates with the base station 101 using a radio communication protocol such as, but not limited to Bluetooth or one of the protocols defined within the IEEE 802.11 specification. In another embodiments, communication between the base station 101 and the controller 102 is performed using infrared light or combinations of infrared light and radio communication protocols. While FIG. 1A shows just the single user 104 with the controller 102, the base station 101 is capable of receiving and processing user input from multiple controllers from multiple users. The base station 101 can use similar wireless communication protocols to communicate with the game console 108. Additionally, in some embodiments, communication between the base station 101 and the game console 108 can be achieved using a wired connection.

With some embodiments, user 104 input to the controller 102 is received by the base station 101. Computer hardware within the base station processes the user input before the user input is relayed to the game console 108. In other embodiments, the base station 101 does not include computer hardware and the user input is relayed from the base station 101 to the game console 108. In other embodiments, the base station 101 includes computer hardware that performs some processing of user input before relaying the user input to the game console 108. In one embodiment, the base station 101 can track the controller 102 within the scene 100.

Figure 1B:
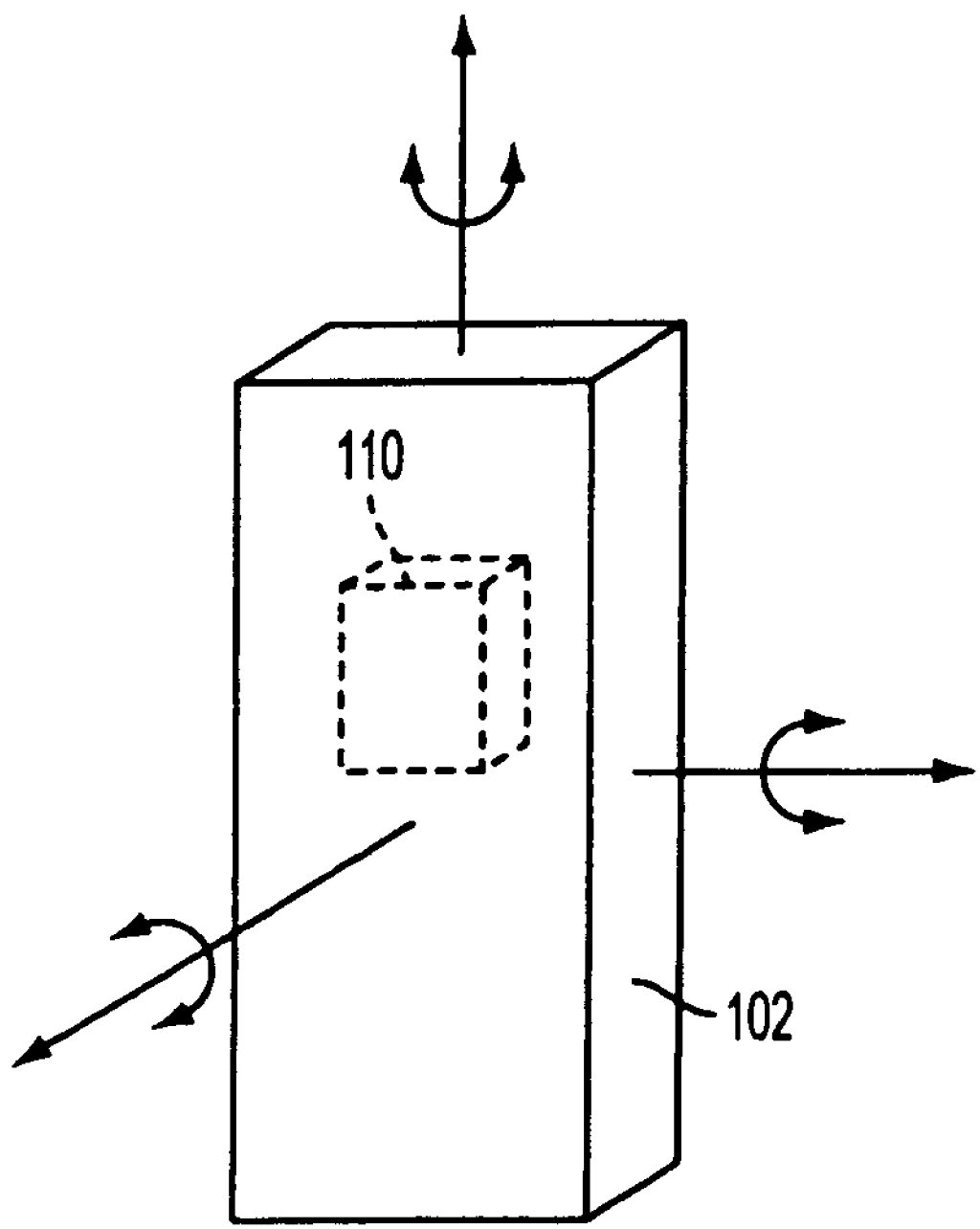
FIG. 1B is an exemplary simplified illustration of a controller, in accordance with one embodiment of the present invention.

FIG. 1B is an exemplary simplified illustration of a controller 102, in accordance with one embodiment of the present invention. The controller 102 includes hardware 110 associated with the controller 102. The hardware 110 allows movement of the controller within the scene to be detected. For example, in one embodiment hardware 110 allows translation of the controller 102 to be detected in directions 112, 114, and 116. Similarly, hardware 110 can also allow detection of roll, pitch and yaw of the controller 102. In one embodiment, the hardware 110 includes three gyroscopes, three accelerometers and three magnetometers. In such an embodiment, the accelerometers provide the direction of gravity and that provides an absolute reference for pitch and roll. Similarly, the magnetometers provide an absolute reference for yaw. Data collected from the combination of the gyroscopes, accelerometers and magnetometers allows the relative position of the controller 102 to be determined. In the embodiment shown, hardware 110 is illustrated embedded or integrated within the controller 102. However, in other embodiments, the hardware 110 is added to an object using a modular attachment to enable motion detection of the object.

The controller 102 also includes radio hardware to enable communications with the base station. The radio hardware allows the controller 102 to be associated with the base station. In embodiments where multiple controllers are associated with the base station, the various controllers can use different radio frequencies to ensure reliable communication with the base station. Other techniques can be used to differentiate signals from multiple controllers to the base station and the specific example provided should not be construed as limiting. The radio hardware also transmits data from the hardware 110 to the base station 101.

Figure 2A:
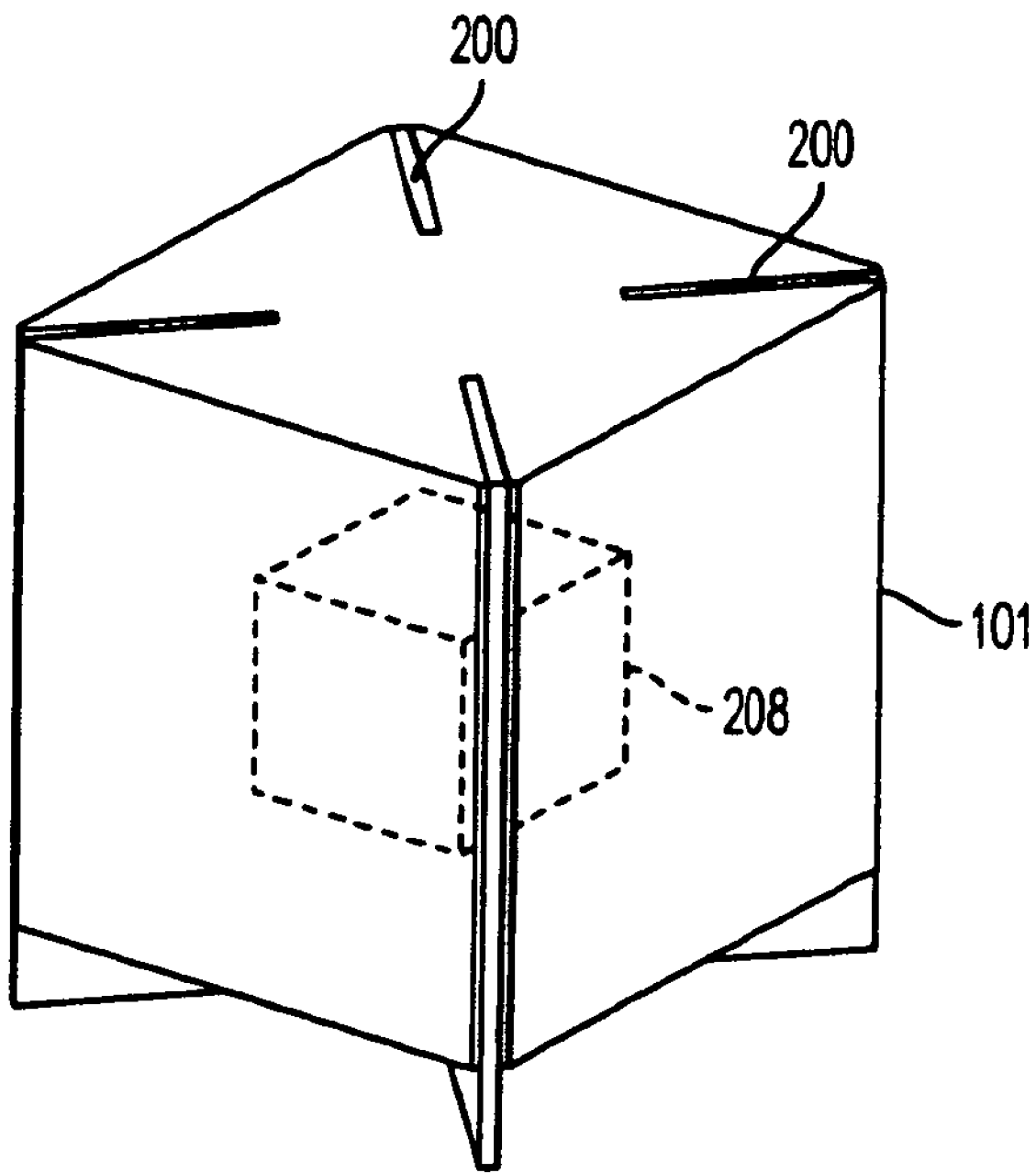
FIG. 2A and FIG. 2B are examples of a base station, in accordance with embodiments of the present invention.
Figure 2B:
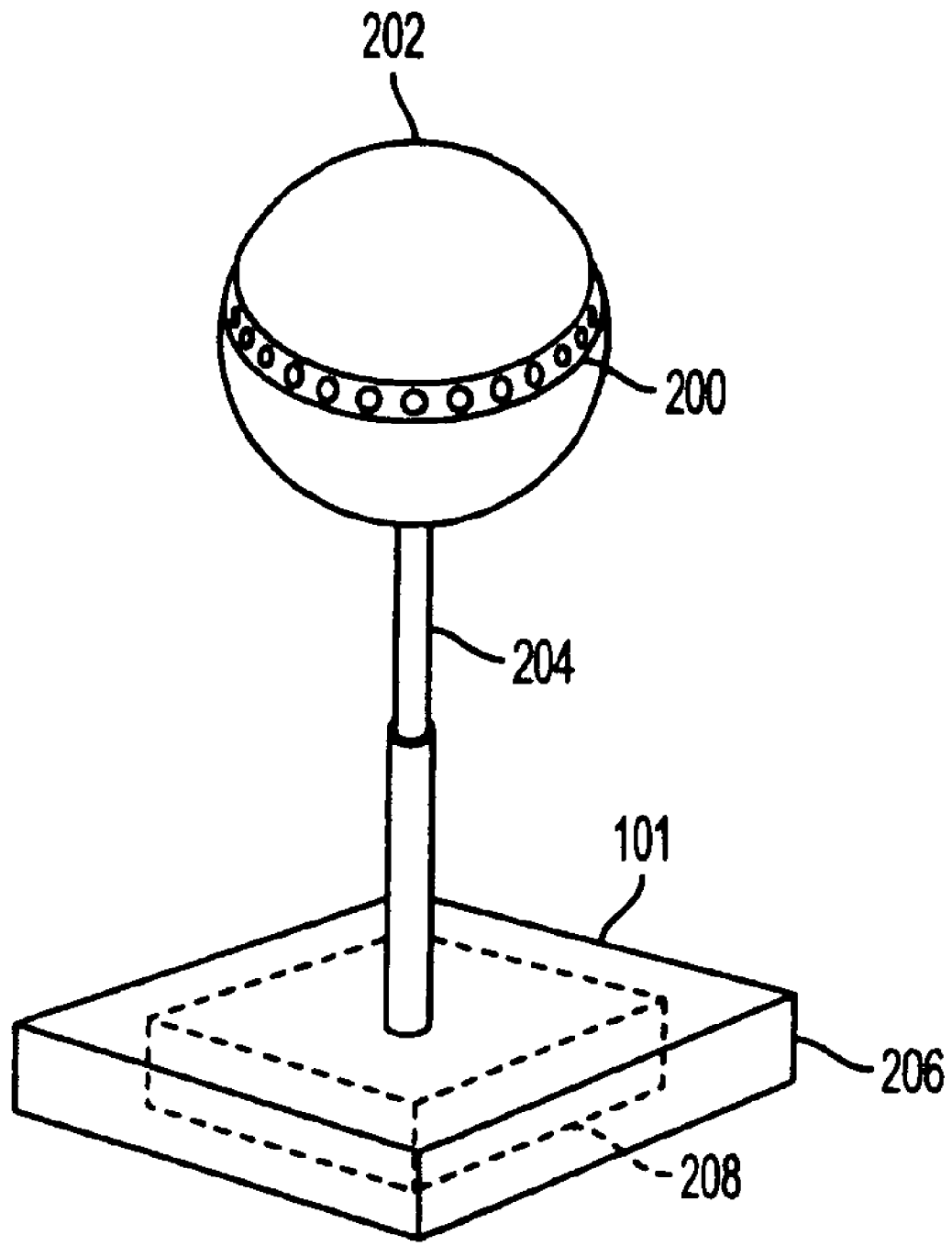

FIG. 2A and FIG. 2B are examples of a base station 101, in accordance with embodiments of the present invention. In either embodiment, the base station 101 establishes a reference plane that assists in determining the relative location of controllers. The use of a base station allows the reference plane to be more closely associated with the controllers thereby improving resolution of movement detection. Similarly, moving the base station away from the game console allows users to calibrate the base station. Something that may not be possible with the game console as game consoles are often stored on shelves or on racks of entertainment systems. Additionally, separating the base station from the game console provides another area where visual and audio feedback is available to the user.

In FIG. 2A, the base station 101 is shown as a basic box with elements 200 at the corners. In such an embodiment, the base station 101 is placed on the floor between the game console and the user. In one embodiment, the elements 200 are made from materials such as frosted or clear glass, or translucent plastics. This allows the elements 200, in conjunction with lights, to act as a light pipe or a light tube in order to provide visual feedback to users. In other embodiments, the elements 200 are small backlit LCD arrays to provide visual feedback. In some embodiments, the combination of lights and elements 200 provide visual feedback based on events happening during game play. In other embodiments, the elements 200 provide visual feedback based on positions of a user relative to the base station. The embodiment illustrated in FIG. 2A should not be considered limiting as to the orientation or placement of elements 200. In other embodiments, elements 200 can form a ring around the base station. In still other embodiments, elements 200 can be arranged in patterns or the entire sides of the base station 101 can be an element 200.

FIG. 2B is another exemplary embodiment of the base station 101. This embodiment also includes element 200 to provide visual feedback to users. Element 200 is included on a sphere 202 that is mounted on an arm 204 mounted to a base 206. The embodiment illustrated in FIG. 2B should not be construed as limiting and the sphere 202 can be replaced with other three dimensional shapes. In various embodiments, the arm 204 can telescope so the height of the sphere 202 above the base 206 can be adjusted. The ability to adjust the height of the sphere 202 can assist in calibrating a reference plane. In other embodiments, the sphere 202 is mounted to the arm 204 on gimbals in order to allow a user to adjust the orientation of the sphere 202 on the end of the arm 204.

In embodiments of the base station 101 shown in FIG. 2A and FIG. 2B have circuitry within the base station 101 can establish a reference plane based on data from hardware that can include, but is not limited to, accelerometers, gyroscopes and magnetometers. With a reference plane, movement of the controllers can be determined relative to the reference plane based on data measurements from the hardware associated with each controller. In other embodiments of the base station 101, user interaction can help establish the reference plane using the lighting. For example, in embodiments that include the sphere 202, the height and orientation of the sphere 202 can be used to establish a reference plane that can be used to determine the relative location of the controllers associated with the base station.

Referring to FIGS. 2A and 2B, in both illustrated embodiments of the base station 101, the elements 200 can include a camera or cameras that capture images of a controller or controllers within a zone of play to assist in determining relative motion of the controller or the controllers. The integration of a camera or cameras within the base station 101 is not restricted to being within the elements 200. The base station 101 also includes base station hardware 208 that includes additional sensors and processors to effectuate operation of the base station.

Figure 2C:
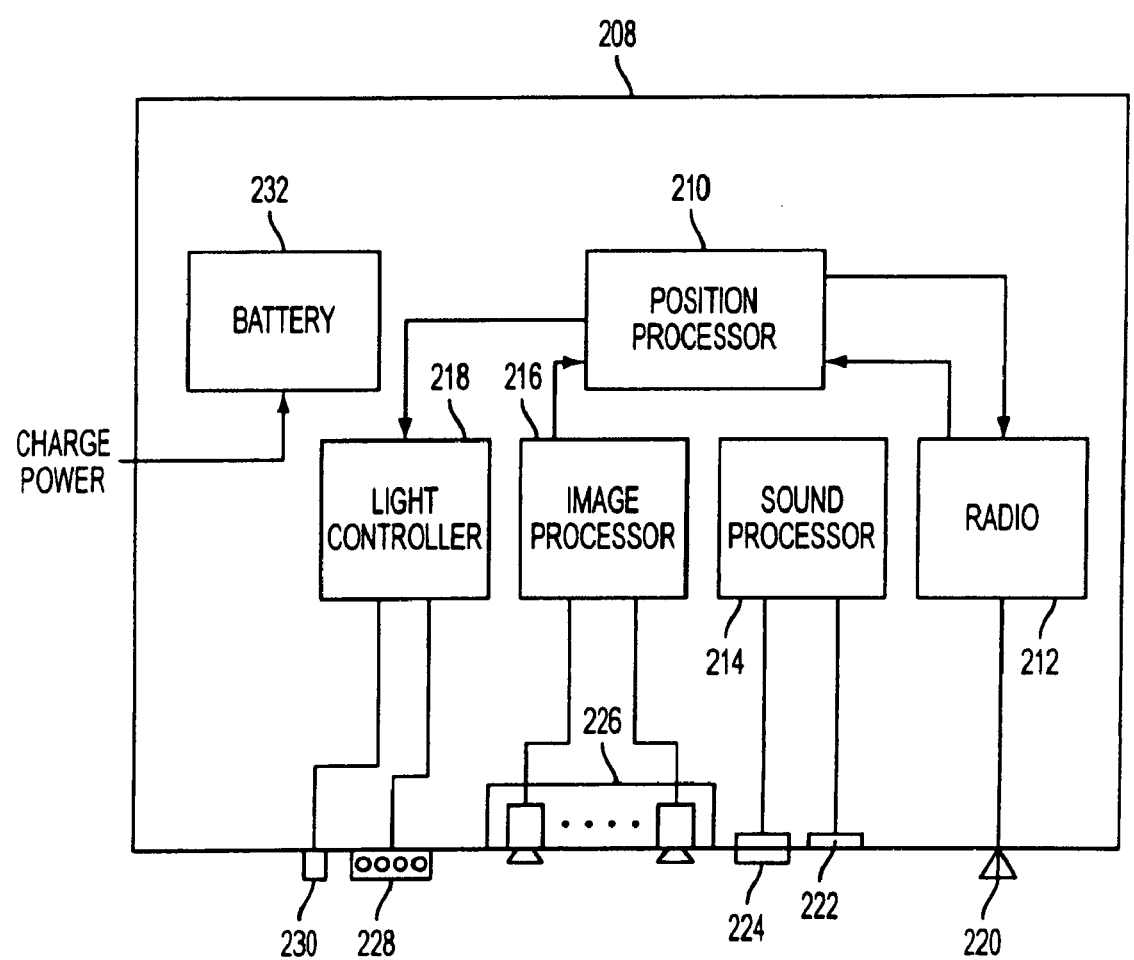
FIG. 2C is an exemplary illustration of base station hardware, in accordance with one embodiment of the present invention.

FIG. 2C is an exemplary illustration of base station hardware 208, in accordance with one embodiment of the present invention. The base station hardware 208 includes a battery 222, a position processor 210 that communicates with a radio 212, a sound processor 214, an image processor 216 and a light controller 218. The battery 222 is optional and is used in wireless embodiments of the base station. In other embodiments, the base station is connected to the game console and can draw power directly from the game console. In one embodiment, the position processor 210 is a custom Application Specific Integrated Circuit (ASIC) while the sound processor 214 and image processor 218 are Digital Signal Processors (DSPs).

The radio 212 is connected to an antenna 220 and is responsible for sending and receiving data to and from the game console. The radio 212 is also configured to send data to any associated controllers and receive data from any associated controllers. The data that is received from the controllers includes data from the hardware. The controller data is sent to the position processor 210 and is used to help determine the position of the controller relative to the base station. In one embodiment, the radio 212 can include radios that rely on different standards, such as, but not limited to Bluetooth or wi-fi.

In some embodiments, the base station includes a speaker 224 and a microphone 222 that are connected to the sound processor. In other embodiments, the microphone 222 is representative of multiple microphones arranged in a microphone array. The use of an array of directional microphones can be used to assist in enhancing game play. Directional microphones combined with voice recognition software could enable users to issue vocal commands to control game play. The speaker 224 can be representative of multiple speakers housed within the base station. The speaker 224 enables the base station to provide audible feedback to users. Audible feedback can be provided based on in-game events or can include game console notifications. An example of in-game event audible feedback would be the sound of running water emanating from the base station as a player approaches an in game stream. An example of a game console notification would be the base station emitting an audible tone or vocal instruction that the controller batteries need to be replaced.

The image processor 216 processes image data from cameras 226. In order to obtain image data from around the base station, multiple cameras can be mounted in various positions on the exterior of the base station. In some embodiments, the cameras 226 use wide-angle lenses to minimize the number of camera necessary to capture images within the zone of play. In one embodiment, the cameras 226 are depth cameras that capture depth data for objects within their field of view. The depth data and image data are processed by the image processor 216 and, in some embodiments, the processed image data is supplied to the position processor 210 to help determine the position of controllers relative to the base station.

The light controller 218 receives data from the position processors 210 and provides visual feedback to users via light array 228 or light emitter 230. In one embodiment, the light array 228 is an array of Light Emitting Diodes (LEDs). In other embodiments, the light array 228 is a Liquid Crystal Display (LCD) or multiple LCDs. The light array 228 is capable of providing visual user feedback based on in-game events. An example of in-game visual feedback available using the light array 228 includes changing the color of the lights associated with a player. Similarly, the light array 228 can also be used to indicate the status of a user. In fighting games, the status can be represented using horizontal or vertical bars that decline as a player is struck. In racing games, the light array 228 can indicate the position of a user within a race. The specific examples provided are intended to be exemplary, and should not be considered limiting. The light array 228 can be configured to display a variety of game related data for any type of game.

In another embodiment, the light array 228 can be used to convey game console status. An example of game console status could include a bar graph showing the performance of an Internet connection associated with the game console. Similarly, chat requests or email notifications can be displayed on the light array. The light array 228 of the base station is a preferred location to display game console status information as it may not be relevant to the game on the main display. Furthermore, as the base station can be positioned closer to the users, the light array may be more visible to the user than a small display directly mounted to the game console.

In still another embodiment, the light array 228 is used to convey controller status. An example of controller status includes visual notification that the batteries in a controller need to be replaced. Another example of controller status would be associating a color with a particular controller and moving the color on the light array 228 as the controller moves about the base station. For example, if two users are playing a game, the light controller can illuminate half of the light array 228 one color for the first user and a second color for the second user. Additionally, based on the data from the position processor, the half of the light array 228 illuminated for the first user can actually be the half on the side closest to the first user.

Similarly, based on data from the position processor, if a user moves a controller from the right side of the base station to the left side of the base station, the light controller will move a light color associated with the controller accordingly. Another example of controller status would be to provide feedback based on the distance of the controller to the base station. For example, the intensity of the light array 228 can fluctuate based on a relative distance of the controller to the base station. Thus, as a user and their associated controller move further away from the base station, the dimmer the associated color of lights on the base station.

The light emitter 230 is used to assist in defining a reference plane. In one embodiment, the light emitter 230 is a laser that projects a visible reference line throughout the room. In order to prevent damage to the eyes of users, bystanders and pets, the light emitter 230 is a low power laser. As will be discussed below, with the base station projecting the visual reference line, users can calibrate and adjust the base station to level the reference plane.

Figure 3A:
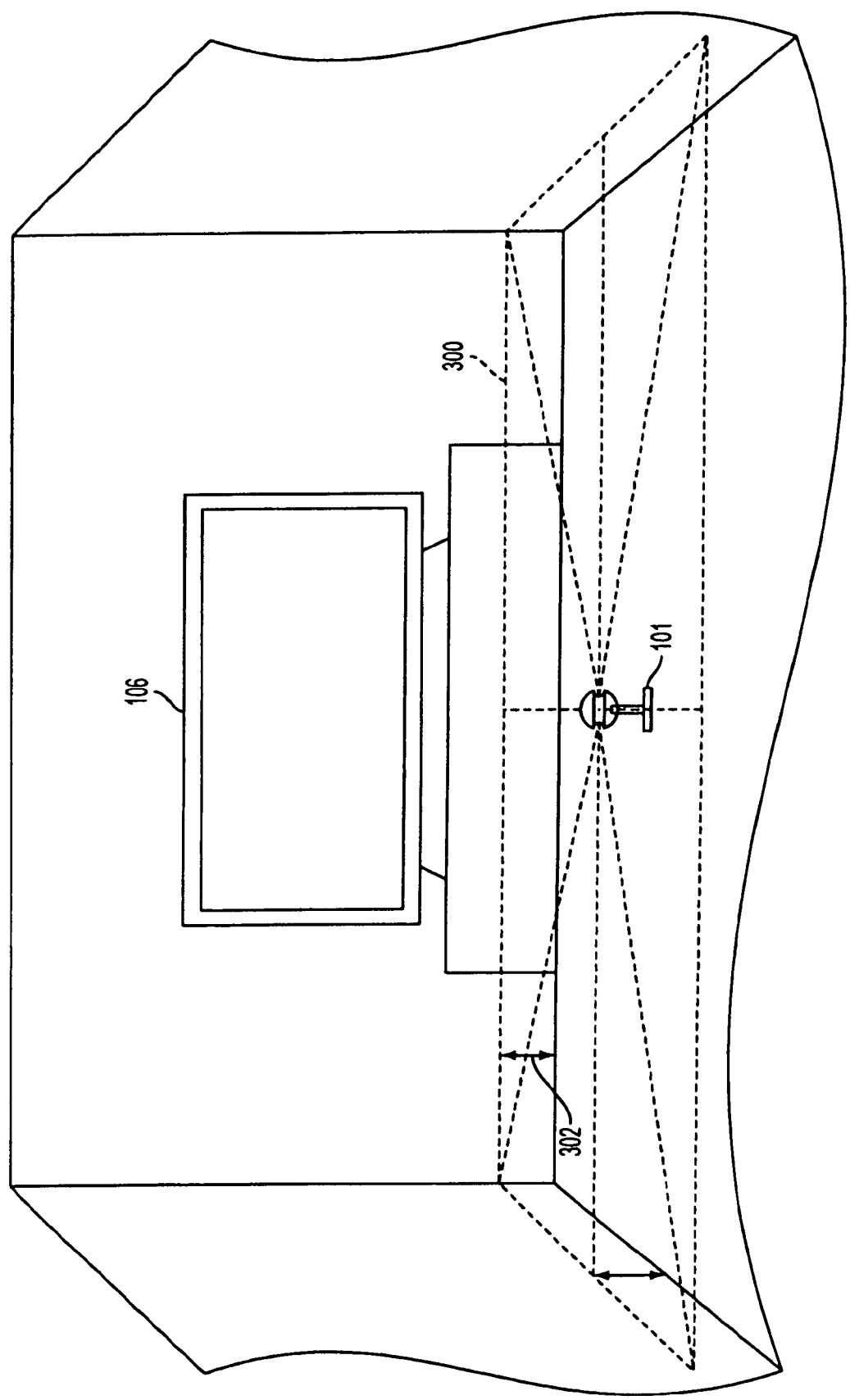
FIG. 3A and FIG. 3B illustrate exemplary calibration techniques for the base station, in accordance with one embodiment of the present invention.
Figure 3B:
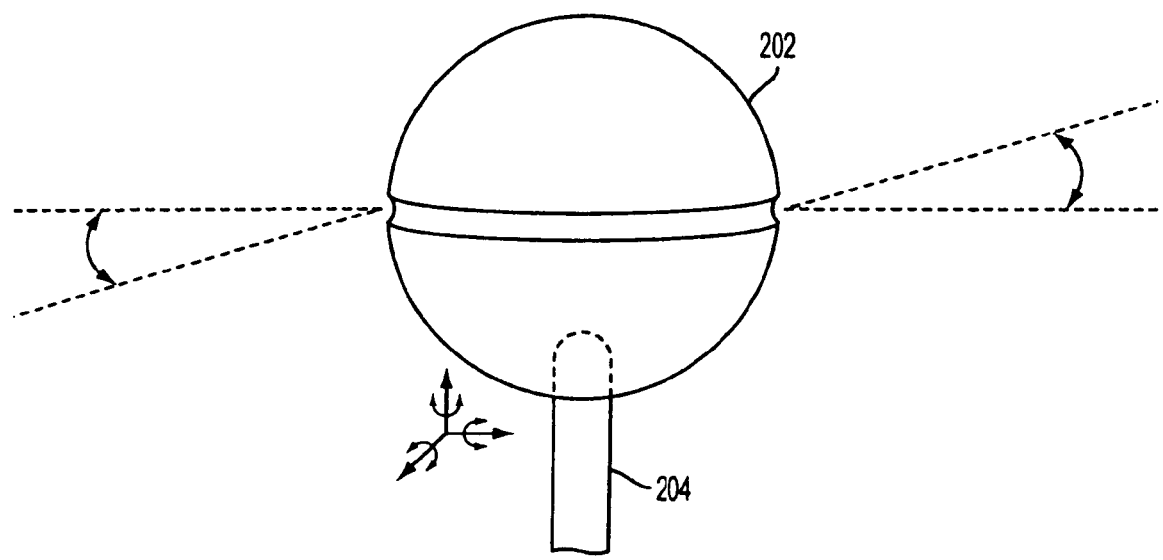

FIG. 3A and FIG. 3B illustrate exemplary calibration techniques for the base station 101, in accordance with one embodiment of the present invention. The calibration technique that is described below is not restricted to embodiments of the base station 101 that include the sphere 202. Other user effectuated calibration techniques can be applied to embodiments such as the one illustrated in FIG. 2A. In FIG. 3A, the base station 101 is shown located on the floor of a room. In one embodiment, the base station is adjusted to a user-defined height using the telescoping feature of the arm. To calibrate the reference plane of the base station 101, the light elements within the base station 101 illuminate a reference plane 300 at a height 302. As shown in FIG. 3B, the gimbals used to mount the sphere 202 to the arm 204 allows adjustments to me made to level the reference plane 300.

Figure 4A:
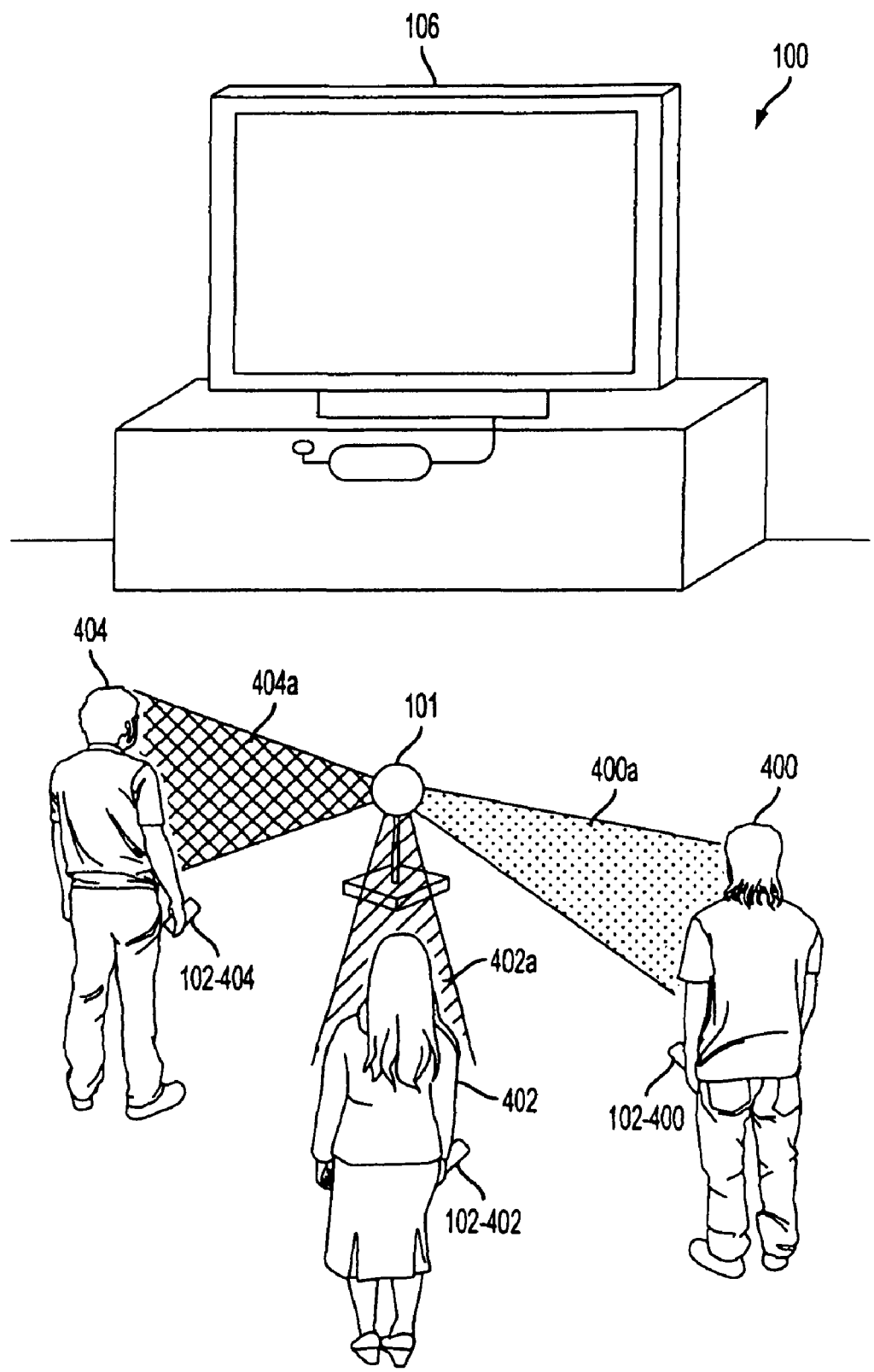
FIGS. 4A-4C illustrate multiple users interacting with the base station, in accordance with one embodiment of the present invention.
Figure 4B:
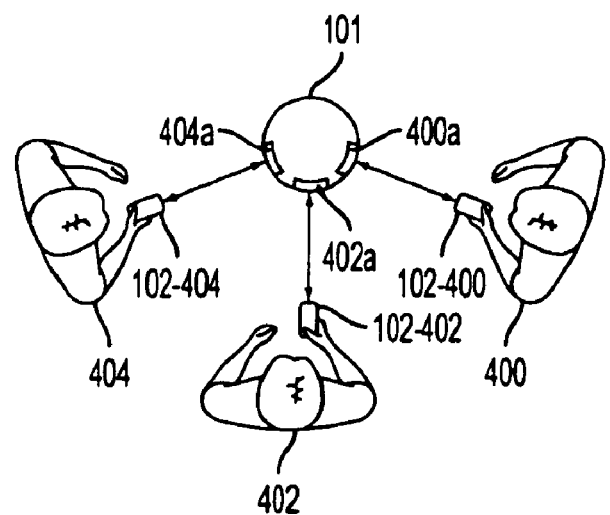
Figure 4C:
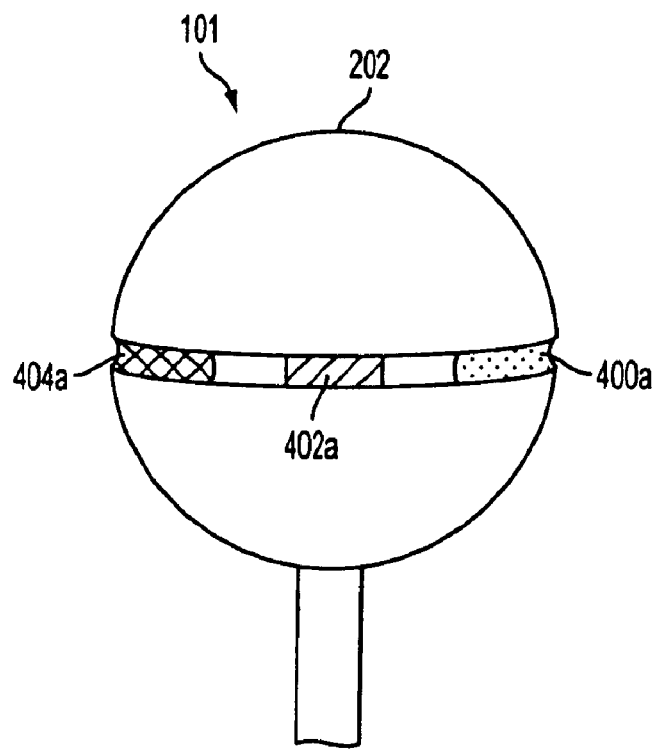

FIGS. 4A-4C illustrate multiple users 400, 402 and 404 interacting with the base station 101, in accordance with one embodiment of the present invention. FIG. 4A illustrates a scene 401 that includes users 400, 402 and 404 with respective controllers 102-400, 102-404 and 102-404. FIG. 4B is a top view of the scene 401 showing the relative position of the users 400, 402 and 404 to the base station 101. FIG. 4B also illustrates that the controllers 102-400, 102-402, and 102-404 are in communication with the base station 101. Each of the controllers 102-400, 102-404 and 102-404 have been paired with the base station 101 and the base station 101 is providing visual feedback to the users 400, 402 and 404. Circuitry within the base station 101 identifies the relative locations of the controllers 102-400, 102-404 and 102-404. With the relative locations of the controllers 102-400, 102-404 and 102-404 the user feedback lighting is illuminated to provide feedback to the users 400, 402 and 404.

In FIGS. 4A-4C, visual feedback 400a, 402a and 404a is illustrated with various hatching patterns. In one embodiment, different sections element 200 on the sphere 202 can be illuminated with various colored lights to indicate the relative position of the users 400, 402 and 404. FIG. 4C is a detail view of the sphere 202 to more clearly indicate areas of element 200 illuminated by visual feedback 400a, 402a and 404a. FIGS. 4A-4C illustrate three users, however, the feedback lighting of the base station can be configured to provide visual feedback to fewer or more users.

Figure 5A:
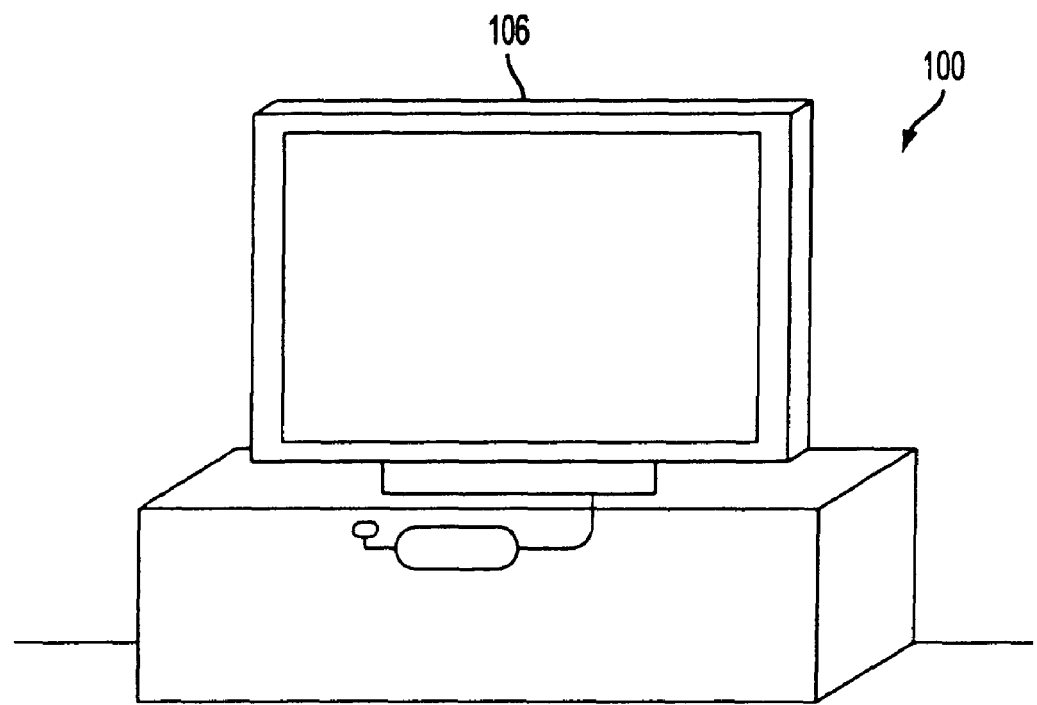
FIGS. 5A-5C illustrate how changes in position of user from FIG. 4A are reflected by the base station, in accordance with one embodiment of the present invention.
Figure 5A:
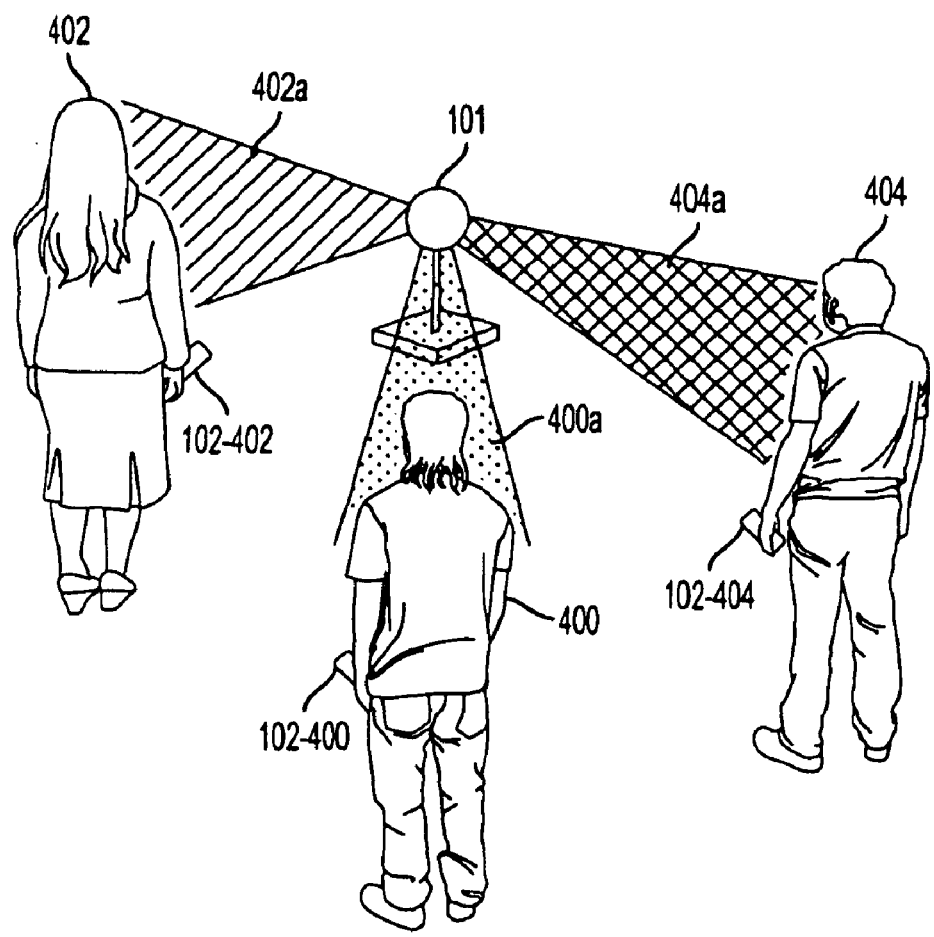
Figure 5B:
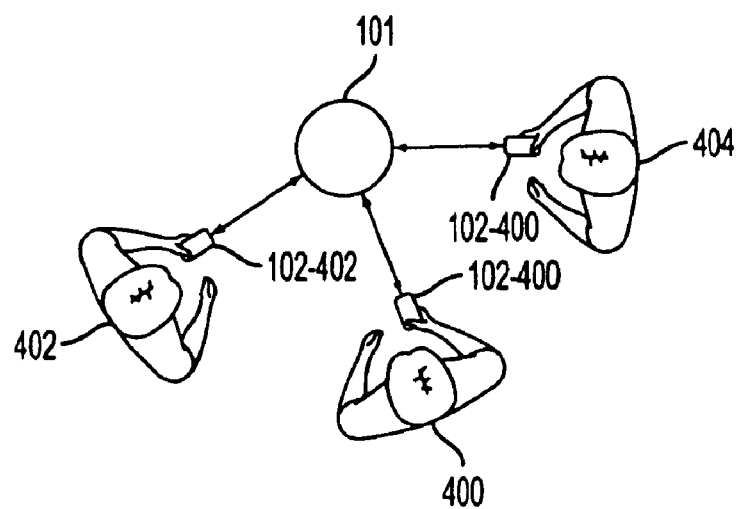
Figure 5C:
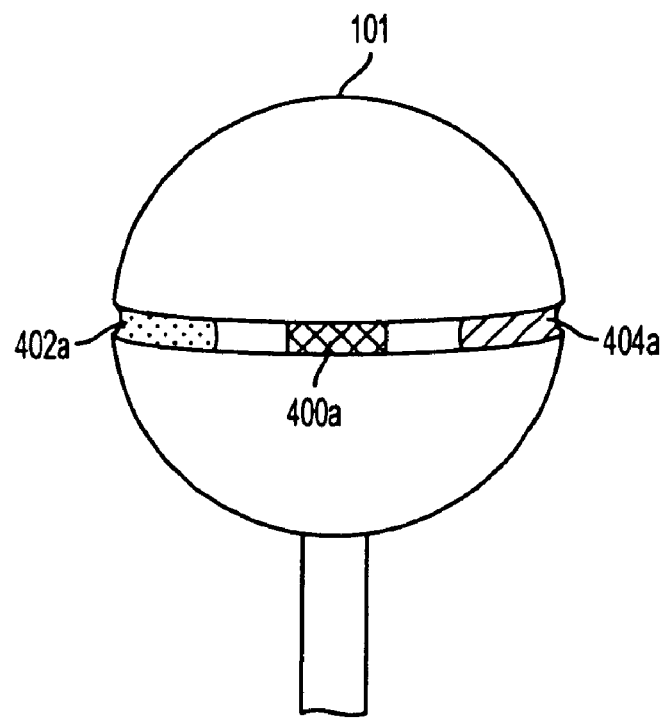

FIGS. 5A-5C illustrate how changes in position of user 400, 402, and 404 from FIG. 4A are reflected by the base station 101, in accordance with one embodiment of the present invention. Comparing FIG. 4A-4C to FIG. 5A-5C, user 404 has moved from the far left to the far right, while users 402 and 404 have shifted to the left. As the respective controllers 102-400, 102-404 and 102-404 have also moved, visual feedback 400a, 402a, and 404a has accordingly shifted. In one embodiment, the visual feedback illustrated changes dynamically as the users move around the scene 401. Thus, if the user 404 took a route toward the monitor, the visual feedback would follow user 404 as she moved through the scene 401. Likewise, as users 402 and 400 moved to the left with their respective controllers, the base station 101 would detect the movement and shift the visual feedback accordingly.

Figure 6A:
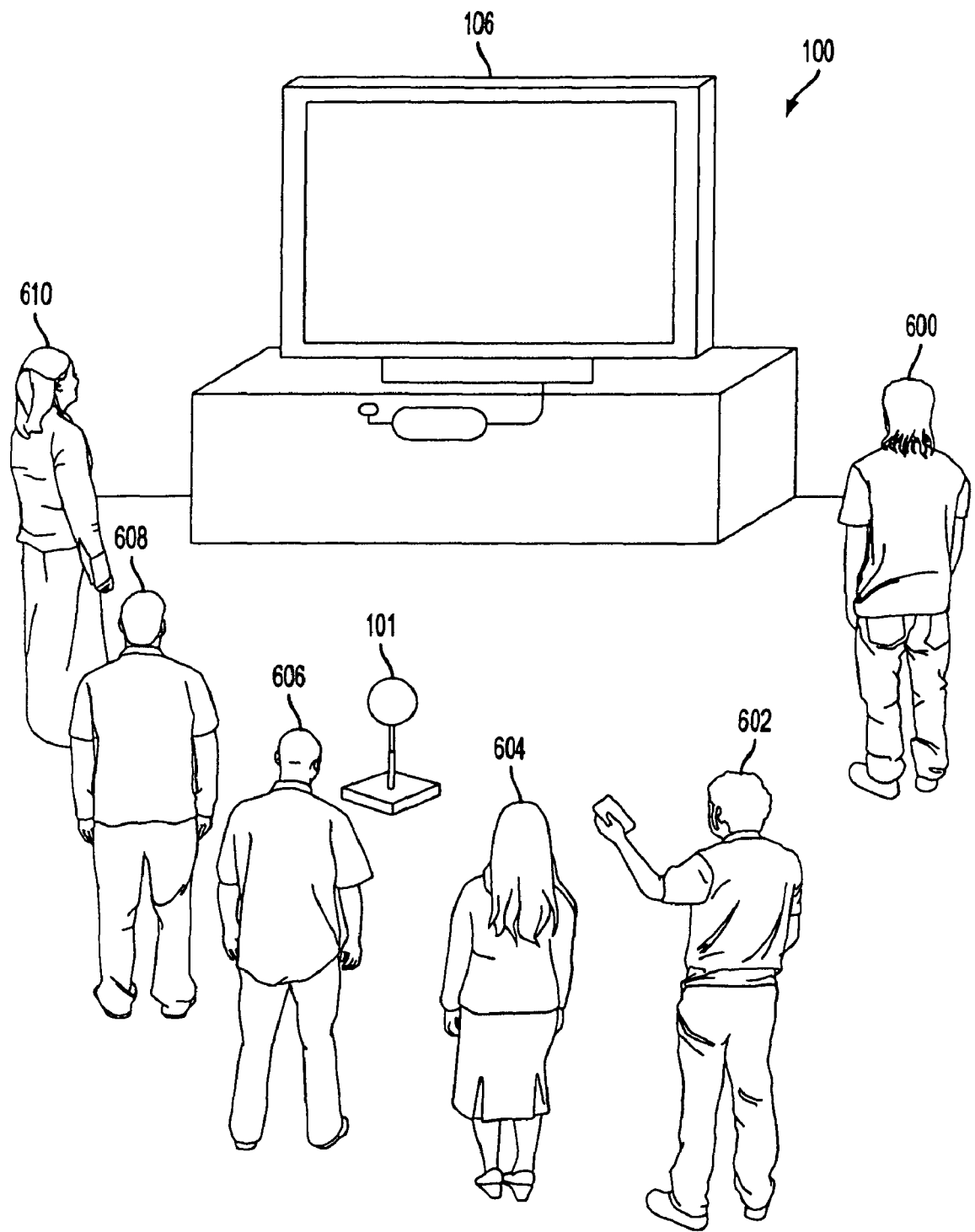
FIGS. 6A and 6B illustrate more users interacting with the base station, in accordance with one embodiment of the present invention.
Figure 6B:
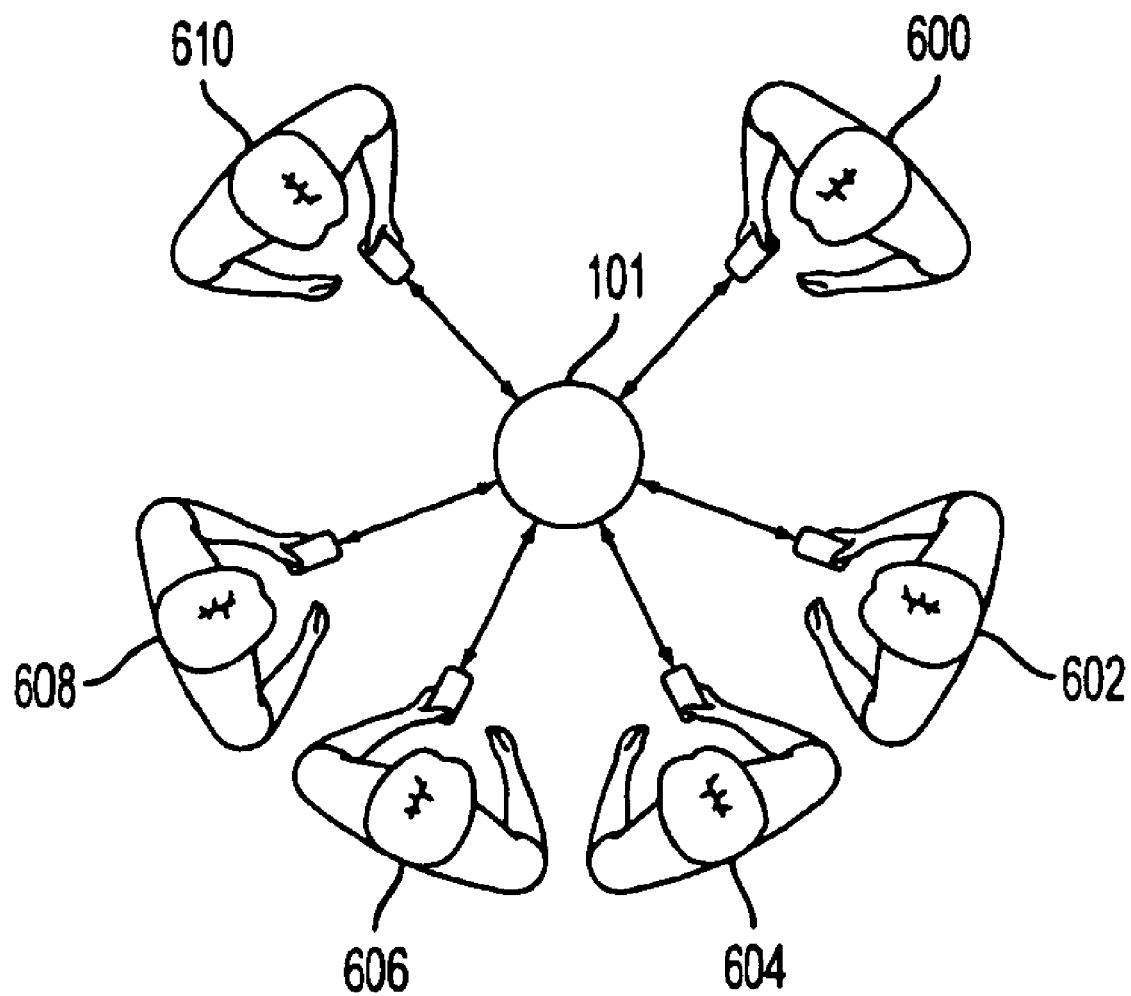

FIGS. 6A and 6B illustrate more users interacting with the base station 101, in accordance with one embodiment of the present invention. This embodiment illustrates that users and their respective controllers can be located between the base station 101 and the monitor 106. While a user standing between the base station 101 and the monitor 106 may not benefit from the visual feedback from the base station 101, the base station still provides the ability to utilize a reference plane in determining relative movement of the controllers.

Figure 7:
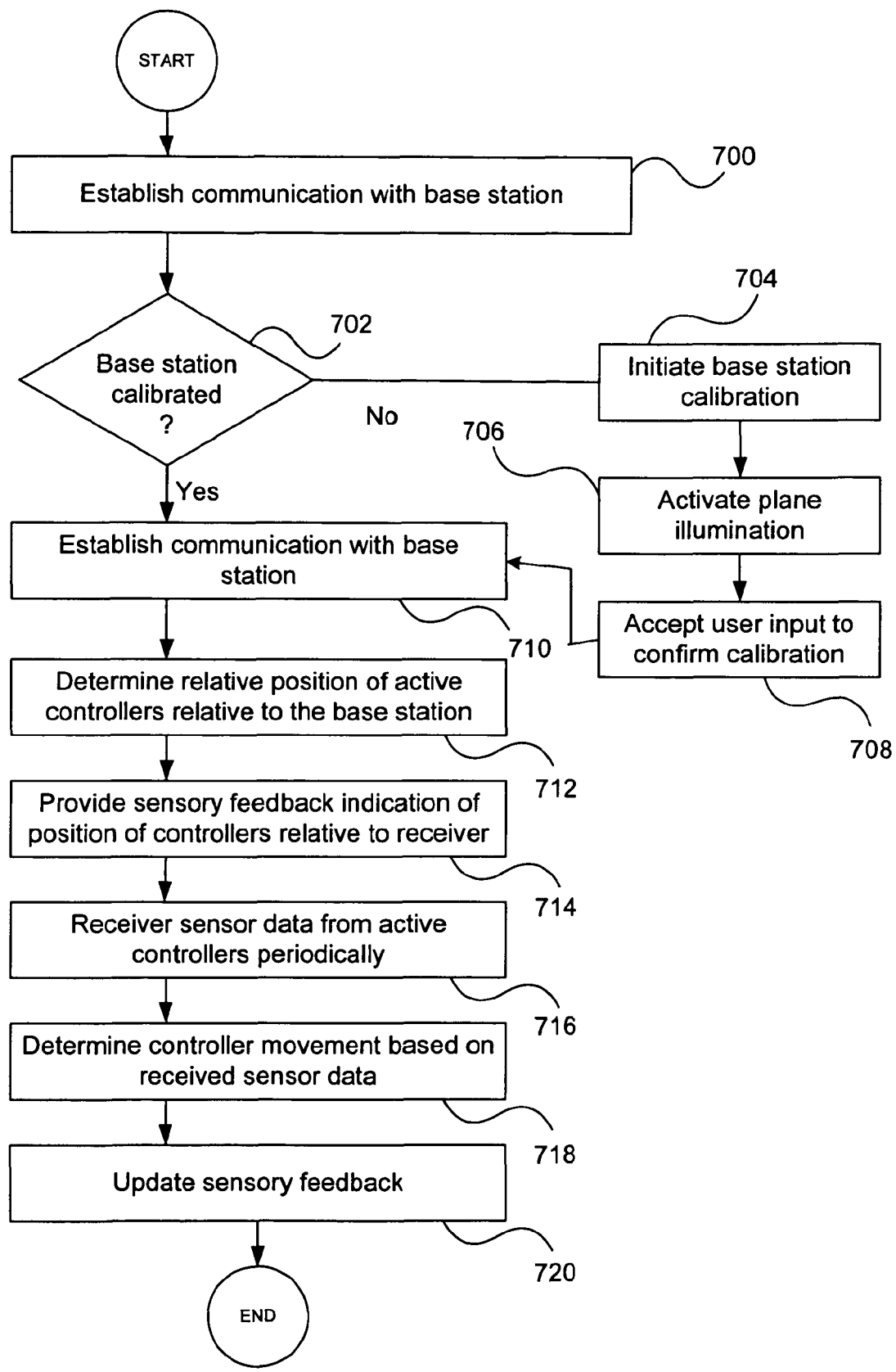
FIG. 7 is an exemplary flow chart illustrating operations to use a base station, in accordance with one embodiment of the present invention.

FIG. 7 is an exemplary flow chart illustrating operations to use a base station, in accordance with one embodiment of the present invention. In operation 700 communications between the base station and the game console are established. In one embodiment, communications are performed through a wired connection between the base station and the game console. In other embodiments, a wireless connection such as BlueTooth or wi-fi is used to facilitate communication between the base station and the game console. Operation 702 checks to see if the base station has been calibrated, or that a reference plane has been established.

In the event that the base station has not been calibrated, operation 704 initiates calibration of the base station. In the embodiment illustrated in FIG. 7, optical calibration is used and operation 706 activates illumination of the reference plane from the base station. Operation 708 accepts user input to the base station, in this embodiment, manipulation of the base station to level the illuminated reference plane. In other embodiments that do not use optical calibration, a user may be required to adjust mechanical elements of the base station to level the reference plane. Regardless of how the reference plane is leveled, when calibration of the base station is completed, operation 710 establishes communications with active controllers.

Operation 710 allows multiple users to associate their controllers with the base station. A variety of techniques can be used to associated and differentiate the controllers such as different radio frequencies or hardware embedded unique controller identifiers. As the active controllers are associated with the base station, data from the motion detecting hardware is sent from the controllers to the base station. Operation 712 utilizes the data from the controllers to determine the relative position of the controllers relative to the base station. As the relative position is determined, operation 714 provides sensory feedback indicative of the position of the controllers.

Operation 716 periodically receives data from the motion sensors on the controllers while operation 718 determines movement of the controllers based on the received sensor data.

Figure 8:
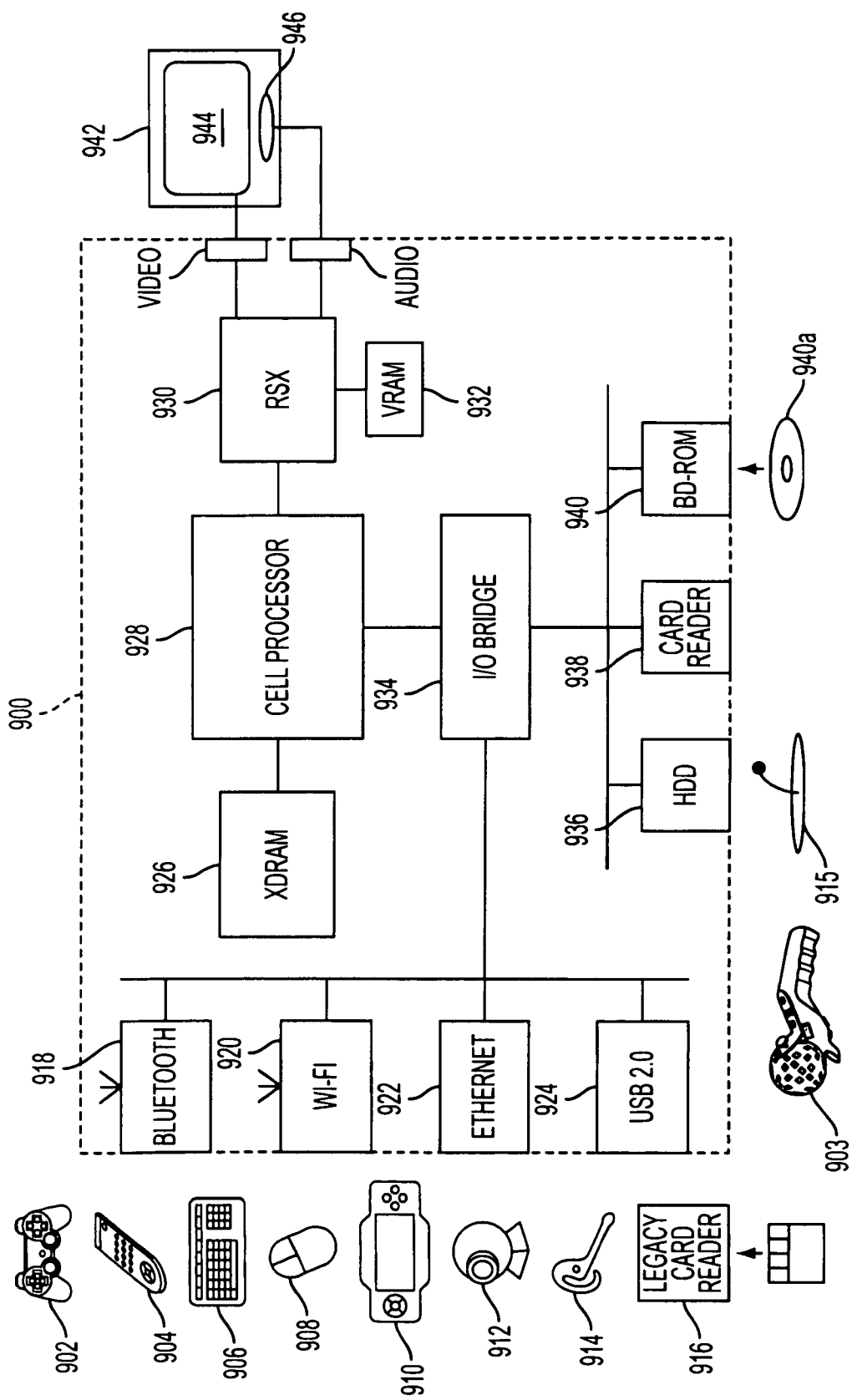
FIG. 8 schematically illustrates the overall system architecture of the Sony® Playstation 3® entertainment device, a game console capable of supporting multiple controllers in accordance with one embodiment of the present invention.

FIG. 8 schematically illustrates the overall system architecture of the Sony® Playstation 3® entertainment device, a game console capable of supporting multiple controllers in accordance with one embodiment of the present invention. A system unit 900 is provided, with various peripheral devices connectable to the system unit 900. The system unit 900 comprises: a Cell processor 928; a Rambus® dynamic random access memory (XDRAM) unit 926; a Reality Synthesizer graphics unit 930 with a dedicated video random access memory (VRAM) unit 932; and an I/O bridge 934. The system unit 900 also comprises a Blu Ray® Disk BD-ROM® optical disk reader 940 for reading from a disk 940*a* and a removable slot-in hard disk drive (HDD) 936, accessible through the I/O bridge 934. Optionally the system unit 900 also comprises a memory card reader 938 for reading compact flash memory cards, Memory Stick® memory cards and the like, which is similarly accessible through the I/O bridge 934.

The I/O bridge 934 also connects to six Universal Serial Bus (USB) 2.0 ports 924; a gigabit Ethernet port 922; an IEEE 802.11b/g wireless network (Wi-Fi) port 920; and a Bluetooth® wireless link port 918 capable of supporting of up to seven Bluetooth connections.

In operation the I/O bridge 934 handles all wireless, USB and Ethernet data, including data from one or more game controllers 903. For example when a user is playing a game, the I/O bridge 934 receives data from the game controller 902 via a Bluetooth link and directs it to the Cell processor 928, which updates the current state of the game accordingly.

The wireless, USB and Ethernet ports also provide connectivity for other peripheral devices in addition to game controllers 902, such as: a remote control 904; a keyboard 906; a mouse 908; a portable entertainment device 910 such as a Sony Playstation Portable® entertainment device; a video camera such as an EyeToy® video camera 912; and a microphone headset 914. Such peripheral devices may therefore in principle be connected to the system unit 900 wirelessly; for example the portable entertainment device 910 may communicate via a Wi-Fi ad-hoc connection, whilst the microphone headset 914 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 916 may be connected to the system unit via a USB port 924, enabling the reading of memory cards 948 of the kind used by the Playstation® or Playstation 2® devices.

In the present embodiment, the game controller 902 is operable to communicate wirelessly with the system unit 900 via the Bluetooth link. However, the game controller 902 can instead be connected to a USB port, thereby also providing power by which to charge the battery of the game controller 902. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 904 is also operable to communicate wirelessly with the system unit 900 via a Bluetooth link. The remote control 904 comprises controls suitable for the operation of the Blu Ray Disk BD-ROM reader 940 and for the navigation of disk content.

The Blu Ray Disk BD-ROM reader 940 is operable to read CD-ROMs compatible with the Playstation and PlayStation 2 devices, in addition to conventional pre-recorded and recordable CDs, and so-called Super Audio CDs. The reader 940 is also operable to read DVD-ROMs compatible with the Playstation 2 and PlayStation 3 devices, in addition to conventional pre-recorded and recordable DVDs. The reader 940 is further operable to read BD-ROMs compatible with the Playstation 3 device, as well as conventional pre-recorded and recordable Blu-Ray Disks.

The system unit 900 is operable to supply audio and video, either generated or decoded by the Playstation 3 device via the Reality Synthesizer graphics unit 930, through audio and video connectors to a display and sound output device 942 such as a monitor or television set having a display 944 and one or more loudspeakers 946. The audio connectors 950 may include conventional analogue and digital outputs whilst the video connectors 952 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 928. The Playstation 3 device's operating system supports Dolby® 5.1 surround sound, Dolby® Theatre Surround (DTS), and the decoding of 7.1 surround sound from Blu-Ray® disks.

In the present embodiment, the video camera 912 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 900. The camera LED indicator is arranged to illuminate in response to appropriate control data from the system unit 900, for example to signify adverse lighting conditions. Embodiments of the video camera 912 may variously connect to the system unit 900 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 900, an appropriate piece of software such as a device driver should be provided. Device driver technology is well-known and will not be described in detail here, except to say that the skilled man will be aware that a device driver or similar software interface may be required in the present embodiment described.

Figure 9:
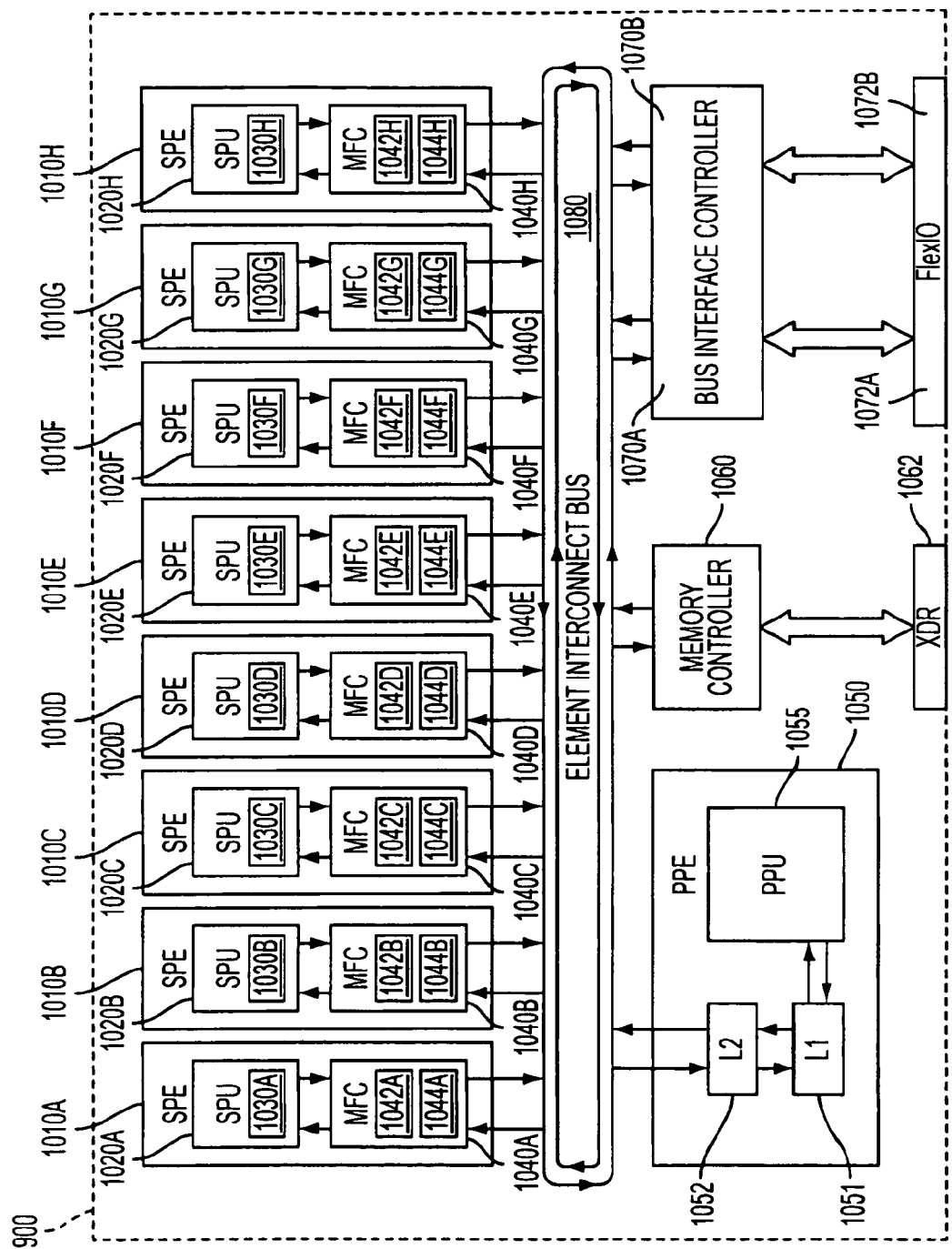
FIG. 9 is a schematic of the Cell processor in accordance with one embodiment of the present invention.

FIG. 9 is a schematic of the Cell processor 928 in accordance with one embodiment of the present invention. The Cell processors 928 has an architecture comprising four basic components: external input and output structures comprising a memory controller 1060 and a dual bus interface controller 1070A,B; a main processor referred to as the Power Processing Element 1050; eight co-processors referred to as Synergistic Processing Elements (SPEs) 1010A-H; and a circular data bus connecting the above components referred to as the Element Interconnect Bus 1080. The total floating point performance of the Cell processor is 218 GFLOPS, compared with the 6.2 GFLOPs of the Playstation 2 device's Emotion Engine.

The Power Processing Element (PPE) 1050 is based upon a two-way simultaneous multithreading Power 970 compliant PowerPC core (PPU) 1055 running with an internal clock of 3.2 GHz. It comprises a 512 kB level 2 (L2) cache and a 32 kB level 1 (L1) cache. The PPE 1050 is capable of eight single position operations per clock cycle, translating to 25.6 GFLOPs at 3.2 GHz. The primary role of the PPE 1050 is to act as a controller for the Synergistic Processing Elements 1010A-H, which handle most of the computational workload. In operation the PPE 1050 maintains a job queue, scheduling jobs for the Synergistic Processing Elements 1010A-H and monitoring their progress. Consequently each Synergistic Processing Element 1010A-H runs a kernel whose role is to fetch a job, execute it and synchronizes with the PPE 1050.

Each Synergistic Processing Element (SPE) 1010A-H comprises a respective Synergistic Processing Unit (SPU) 1020A-H, and a respective Memory Flow Controller (MFC) 1040A-H comprising in turn a respective Dynamic Memory Access Controller (DMAC) 1042A-H, a respective Memory Management Unit (MMU) 1044A-H and a bus interface (not shown). Each SPU 1020A-H is a RISC processor clocked at 3.2 GHz and comprising 256 kB local RAM 1030A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1020A-H does not directly access the system memory XDRAM 926; the 64-bit addresses formed by the SPU 1020A-H are passed to the MFC 1040A-H which instructs its DMA controller 1042A-H to access memory via the Element Interconnect Bus 1080 and the memory controller 1060.

The Element Interconnect Bus (EIB) 1080 is a logically circular communication bus internal to the Cell processor 928 which connects the above processor elements, namely the PPE 1050, the memory controller 1060, the dual bus interface 1070A,B and the 8 SPEs 1010A-H, totaling 12 participants. Participants can simultaneously read and write to the bus at a rate of 8 bytes per clock cycle. As noted previously, each SPE 1010A-H comprises a DMAC 1042A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 1060 comprises an XDRAM interface 1062, developed by Rambus Incorporated. The memory controller interfaces with the Rambus XDRAM 926 with a theoretical peak bandwidth of 25.6 GB/s.

The dual bus interface 1070A,B comprises a Rambus FlexIO® system interface 1072A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 928 to the Reality Simulator graphics unit 930 will typically comprise display lists, being a sequence of commands to draw vertices, apply textures to polygons, specify lighting conditions, and so on. Embodiments may include capturing depth data to better identify the real-world user and to direct activity of an avatar or scene. The object can be something the person is holding or can also be the person's hand. In the this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the third-dimension in addition to normal two-dimensional video imagery. With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's game experience. For example, computer generated costumes can be inserted over the user's clothing, and computer generated light sources can be utilized to project virtual shadows within a video scene. Hence, using the embodiments of the present invention and a depth camera, users can experience an interactive game environment within their own living room. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

Figure 10:
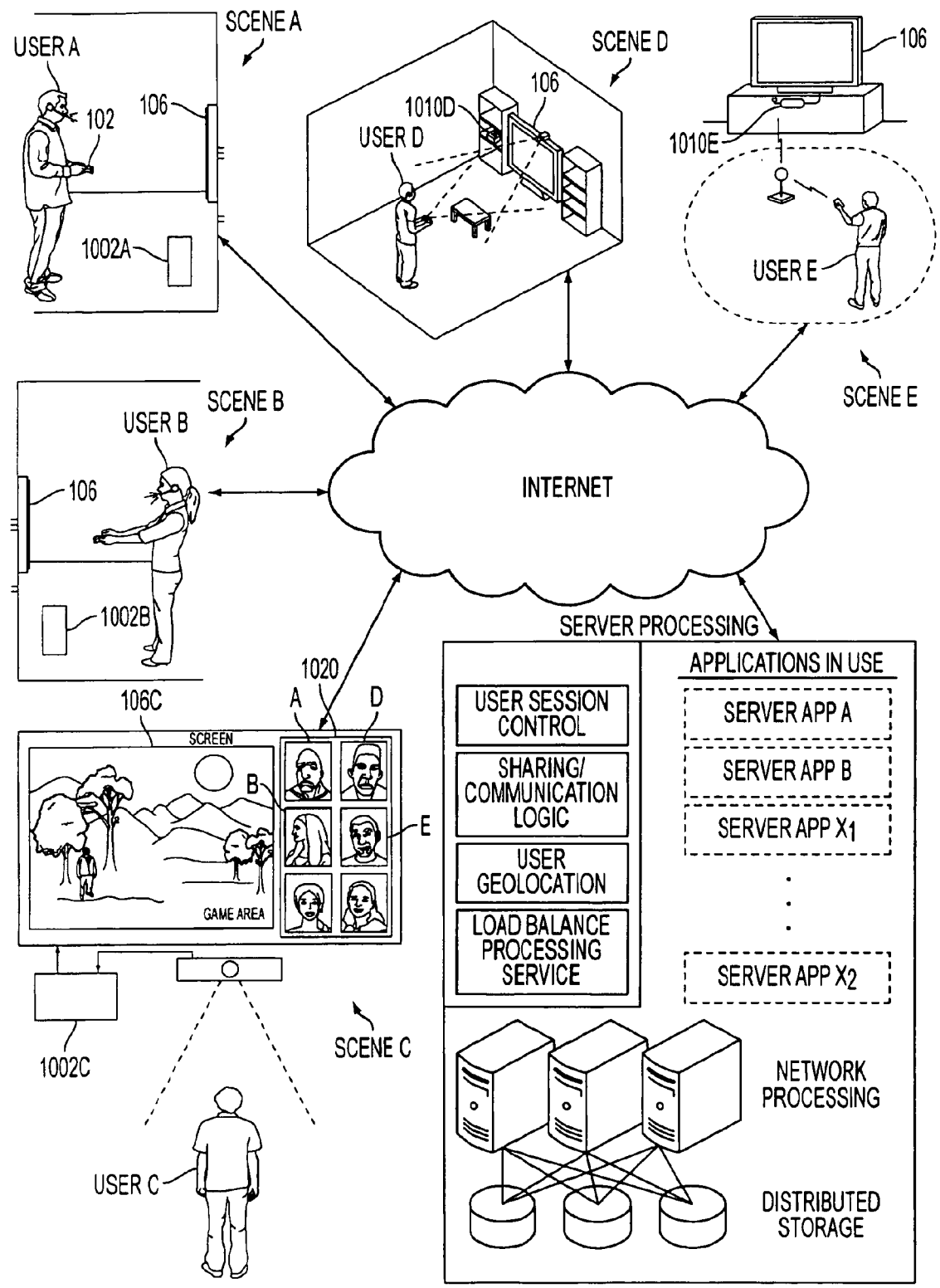
FIG. 10 is an exemplary illustration of scene A through scene E with respective user A through user E interacting with game clients that are connected to server processing via the internet, in accordance with one embodiment of the present invention.

FIG. 10 is an exemplary illustration of scene A through scene E with respective user A through user E interacting with game clients or game consoles 1002 that are connected to server processing via the internet, in accordance with one embodiment of the present invention. As previously discussed, a game client is a device that allows users to connect to server applications and processing via the internet. The game client allows users to access and playback online entertainment content such as but not limited to games, movies, music and photos. Additionally, the game client can provide access to online communications applications such as VOIP, text chat protocols, and email.

A user interacts with the game client via controller. In some embodiments the controller is a game client specific controller while in other embodiments, the controller can be a keyboard and mouse combination. In one embodiment, the game client is a standalone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Within scene A of FIG. 10, user A interacts with a client application displayed on a monitor 106 using a controller 102 paired with game client 1002A. Similarly, within scene B, user B interacts with another client application that is displayed on monitor 106 using a controller 102 paired with game client 1002B. Scene C illustrates a view from behind user C as he looks at a monitor displaying a game and buddy list from the game client 1002C. While FIG. 10 shows a single server processing module, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 1002 connects to a server processing module, user session control may be used to authenticate the user. An authenticated user can have associated virtualized distributed storage and virtualized network processing. Examples items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

As shown in FIG. 10, the server processing module has instances of server application A and server application B. The server processing module is able to support multiple server applications as indicated by server application $X_1$ and server application $X_2$. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 1002C allows user C to create and view a buddy list 1020 that includes user A, user B, user D and user E. As shown, in scene C, user C is able to see either real time images or avatars of the respective user on monitor 106C. Server processing executes the respective applications of game client 1002C and with the respective game clients 1002 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment two-way real time voice communication is established through a client/server application. In another embodiment, a client/server application enables text chat. In still another embodiment, a client/server application converts speech to text for display on a buddy's screen. Scene D and scene E illustrate respective user D and user E interacting with game consoles 1010D and 1010E respectively. Each game console 1010D and 1010E are connected to the server processing module and illustrate a network where the server processing modules coordinates game play for both game consoles and game clients.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system to interface with a game client to control a video game, comprising:
   a game client;
   a base station being interfaced with the game client, the base station having processing circuitry, the processing circuitry configured to send and receive data between the base station and the game client, the base station further configured to process position data; and
   a controller being interfaced with the base station, the controller having hardware to process movement data of the controller and communicate the movement data to the base station, the base station processing the movement data of the controller, the position data being relayed from the base station to the game client to determine a relative position of the controller to the base station, wherein changes in the relative position of the controller facilitate interactive control with the video game;
   wherein the controller is further interfaced directly with the game client so as to wirelessly communicate input data generated by one or more inputs of the controller to the game client without communicating with the base station.

2. The system as described in claim 1, wherein the controller further communicates the movement data to the game client without communicating with the base station.

3. The system as described in claim 1, wherein the base station further includes,
   light emitting circuitry, the light emitting circuitry projecting light from the base station.

4. The system as described in claim 3, wherein the base station further includes,
   alignment circuitry, the alignment circuitry configured to define a reference plane that is used to determine the position of the controller relative to the reference plane.

5. The system as described in claim 4, wherein the light emitting circuitry projects a reference light to visually illustrate the reference plane of the base station.

6. The system as described in claim 3, wherein the light emitting circuitry provides visual feedback based on the relative position of the controller to the base station.

7. The system as described in claim 3, wherein the light emitting circuitry provides visual feedback based on events within the video game.

8. The system as described in claim 1, wherein the one or more inputs of the controller include one or more of a button, or a joystick, or a motion sensor.

9. A system to interface with a game client to control a video game, comprising:
   a game client;
   a base station being interfaced with the game client, the base station having processing circuitry, the processing circuitry configured to send and receive data between the base station and the game client, the base station further configured to process position data; and
   a controller being interfaced with the base station, the controller having hardware to process movement data of the controller and communicate the movement data to the base station, the base station processing the movement data of the controller, the position data being relayed from the base station to the game client to determine a relative position of the controller to the base station, wherein changes in the relative position of the controller facilitate interactive control with the video game;
   light emitting circuitry, the light emitting circuitry projecting light from the base station;
   alignment circuitry, the alignment circuitry configured to define a reference plane that is used to determine the position of the controller relative to the reference plane.

10. The system as described in claim 9, wherein the light emitting circuitry projects a reference light to visually illustrate the reference plane of the base station.

11. The system as described in claim 9, wherein the light emitting circuitry provides visual feedback based on the relative position of the controller to the base station.

12. The system as described in claim 9, wherein the light emitting circuitry provides visual feedback based on events within the video game.

13. A system to interface with a game client to control a video game, comprising:
   a game client;

a base station being interfaced with the game client, the base station having processing circuitry, the processing circuitry configured to send and receive data between the base station and the game client; and a controller being interfaced with the base station, the controller having hardware to sense movement data of the controller and communicate the movement data to the base station, the base station processing the movement data of the controller to generate position data defining a relative position of the controller to the base station, the position data being relayed from the base station to the game client, wherein changes in the relative position of the controller facilitate interactive control with the video game, wherein the controller is configured to communicate input data generated by an input of the controller to the game client without communicating with the base station;

light emitting circuitry, the light emitting circuitry projecting light from the base station, the light emitting circuitry providing visual feedback indicating the relative position of the controller to the base station.

14. The system as described in claim 13, wherein the light emitting circuitry is configured to shift the visual feedback in accordance with movement of the controller.

15. The system as described in claim 13, wherein the input of the controller is one of a button, or a joystick, or a motion sensor.

\* \* \* \* \*